United States Patent [19]

Izumi et al.

[11] Patent Number: 4,606,313

[45] Date of Patent: Aug. 19, 1986

[54] METHOD OF AND SYSTEM FOR CONTROLLING HYDRAULIC POWER SYSTEM

[75] Inventors: Eiki Izumi; Hiroshi Watanabe; Yukio Aoyagi; Kazuo Honma; Kichio Nakajima, all of Ibaraki, Japan

[73] Assignee: Hitachi Construction Machinery Co., Ltd., Tokyo, Japan

[21] Appl. No.: 387,884

[22] PCT Filed: Oct. 8, 1981

[86] PCT No.: PCT/JP81/00270

§ 371 Date: Jun. 9, 1982

§ 102(e) Date: Jun. 9, 1982

[87] PCT Pub. No.: WO82/01396

PCT Pub. Date: Apr. 29, 1982

[51] Int. Cl.$^4$ .............................................. F02M 39/00
[52] U.S. Cl. ................................. 123/386; 414/699; 123/357
[58] Field of Search ........ 123/387, 385, 386, 357–359; 414/699

[56] References Cited

U.S. PATENT DOCUMENTS 4,373,850 2/1983 Durham .............................. 123/386

FOREIGN PATENT DOCUMENTS 0049536 4/1980 Japan .................................. 123/357
0626236 9/1978 U.S.S.R. ............................. 123/357

Primary Examiner—Carl Stuart Miller
Attorney, Agent, or Firm—Antonelli, Terry & Wands

[57] ABSTRACT

A method of and system for controlling a hydraulic power system comprising an internal combustion engine receiving a supply of fuel from a fuel injection pump, and at least one variable displacement hydraulic pump driven by the internal combustion engine. An engine speed deviation is obtained from the difference between a target speed set by an accelerator operation of the internal combustion engine and an output speed thereof. Then a fuel injection target value in predetermined functional relation to the engine speed deviation, is obtained based on at least the engine speed deviation, and a fuel injection rate of the fuel injection pump is controlled based on the fuel injection target value. At the same time, a displacement volume target value of the hydraulic pump is determined based on at least the engine speed deviation and an actual discharge pressure of the hydraulic pump in such a manner that as the engine speed deviation increases an input torque of the hydraulic pump decreases, and the displacement volume of the hydraulic pump is controlled based on the displacement volume target value.

31 Claims, 40 Drawing Figures

METHOD OF AND SYSTEM FOR CONTROLLING HYDRAULIC POWER SYSTEM

BACKGROUND OF THE INVENTION

This invention relates to a method of and a system for controlling a hydraulic power system comprising an internal combustion engine receiving a supply of fuel from a fuel injection pump, and at least one variable displacement hydraulic pump driven by the internal combustion engine, such as a drive means for a hydraulic shovel.

Heretofore, in a hydraulic drive system wherein a plurality of variable displacement hydraulic pumps are driven by a single internal combustion engine for generating hydraulic power, such as a drive means for a hydraulic shovel, the three control systems have been available for distributing the output hosepower of the internal combustion engine to the hydraulic pumps; namely, an individual control system, a cross-sensing system, and an engine-speed sensing system.

In the individual control system when, for example, two hydraulic pumps are used, one-half the maximum output hosepower of the internal combustion engine is distributed to each hydraulic pump and the circuit pressure of each hydraulic pump is separately sensed to thereby control the discharge rate of the pump In this system, inconvenience is experienced in that when no load is applied to one of the hydraulic pumps, it is impossible for the other hydraulic pump to utilize the excess horsepower of the one hydraulic pump.

In the cross-sensing system when a load applied to one hydraulic pump is low, the other hydraulic pump utilizes part of the excess hosepower of the one hydraulic pump by allowing the circuit pressures of the two hydraulic pumps to be transmitted to each other This system is superior to the individual control system with respect to utilization of horsepower. However, the regulator for controlling the discharge rate of each pump is complex.

In the engine-speed sensing system, a drop in engine speed effects control of the discharge rate of each hydraulic pump and maximizes the utilization of horsepower. An example of this type of control system is disclosed in, for example, SAE PAPER 760687 (Electrohydraulic Control of Hydrostatic Transmission by T. P. Neal). This control method is superb in that the displacement volume of the hydraulic pump or its tilting angle is restricted by sensing a drop in engine speed.

In the above-mentioned control method of the prior art a mechanical all-speed governor is used for sensing a drop in engine speed. Because of this, when the engine speed undergoes a very small change, it does not follow that the change in speed represents a similar change in the engine operating condition in all the speed ranges. For example, when such small speed change occurs, the engine may tend to stall in a certain speed range, and when the same speed change occurs, the engine may continue to operate normally in other speed ranges. Moreover, mechanical all-speed governors may vary from one another due to production errors that might be committed in performing machining or due to changes with time. Thus, even in a specific speed range, a change in the engine operating condition indicated by a very small change in engine speed may finely vary from one mechanical governor to another and with elapsing of time. Thus, difficulties would be encountered in effecting adjustments of a set point for controlling a swash plate tilting in conformity with a change in engine speed. Even if an attempt is made to adjust the set point in such a manner that limitations are placed on the swash plate tilting by using a certain speed change as a reference, it would be impossible to maximize engine horsepower in other speed ranges than specific speed range.

Also, in the above-mentioned control method operating, characteristics undergo changes when a plurality of hydraulic actuators are connected to a single hydraulic pump as is the case with a hydraulic shovel. Because of this, the control method uses series compensation steps for preventing a delay in response to a variation in the discharge pressure of the pump. There are, however, limits to improvements in performance, so a problem arises with respect to the stability of the control system.

An object of the present invention in providing a hydraulic power system comprising an internal combustion engine receiving a supply of fuel from a fuel injection pump, and at least one variable displacement hydraulic pump driven by the internal combustion engine, a method of for controlling such hydraulic power system in which adjustments of the setting point are facilitated, whereby the engine horsepower can be effectively utilized to a maximum in all the speed ranges and good stability with respect to, for example, changes in the discharge pressure of the pump, for example can be achieved.

In accordance with the present invention a method of controlling a hydraulic power system comprising an internal combustion engine receiving a supply of fuel from a fuel injection pump, and at least one variable displacement hydraulic pump driven by the internal combustion engine is provided which includes the steps of obtaining a speed deviation from a difference between a target speed set by an accelerator operation of the internal combustion engine and an output speed of the engine; obtaining a fuel injection target value based on the engine speed deviation, with the fuel injection target value being in predetermined functional relationship to the deviation; controlling a fuel injection rate of the fuel injection pump based on the fuel injection target value; determining, at the same time, a displacement volume target value of the hydraulic pump based on at least the engine speed deviation and an actual discharge pressure of the hydraulic pump in such a manner that an input torque of the hydraulic pump decreases as the engine speed deviation increases; and controlling the displacement volume of the hydraulic pump based on the displacement volume target value.

Also, the invention provides a system for controlling a hydraulic power system comprising an internal combustion engine receiving a supply of fuel from a fuel injection pump, least one variable displacement hydraulic pump driven by the internal combustion engine, with the system comprising means for obtaining an engine speed deviation from the difference between a target speed set by an acceleration operation of the internal combustion engine and an output speed of the engine and means for obtaining a fuel injection target value based on with the engine speed deviation, said fuel injection target value being in predetermined functional relationship to the deviation. Means are provided for controlling a fuel injection rate of the fuel injection pump based on the fuel injection target value, and means are provided for determining, at the same time, a displacement volume target value of the hydraulic pump based on at least the speed deviation and an actual discharge pressure of the hydraulic pump in such a manner that an input torque of the hydraulic pump decreases as the speed deviation increases. Additionally means are provided for controlling the displacement volume of the hydraulic pump based on the displacement volume target value.

DETAILED DESCRIPTION

In order that the invention may be described in detail, embodiments of the invention will now be described by referring to the accompanying drawings.

Figure 1:
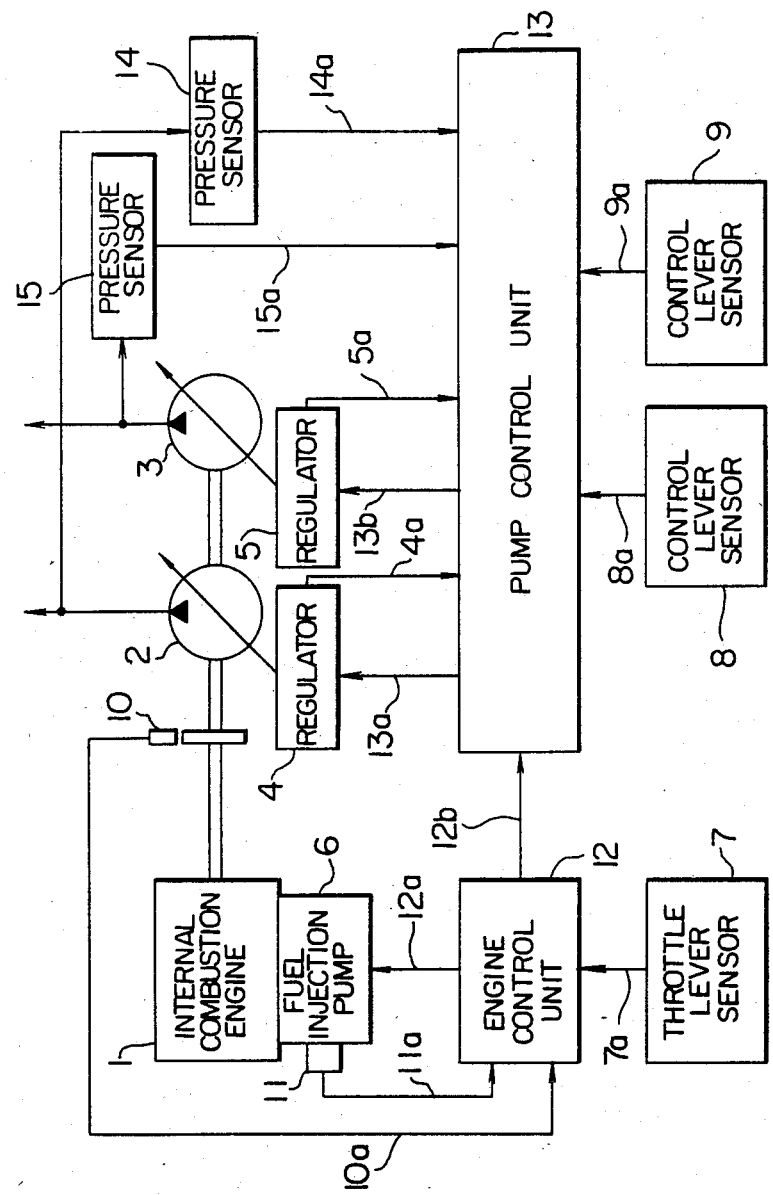
FIG. 1 is a schematic view of the control system comprising one embodiment of the invention for a hydraulic power system comprising an internal combustion engine and hydraulic pumps.

Referring now to the drawings wherein like reference numerals are used throughout the various views to designate like parts and, more particularly, to FIG. 1, according to this Figure, a hydraulic power system is provided which includes an internal combustion engine 1 and variable displacement hydraulic pumps 2, 3 driven by the internal combustion engine 1. Swash plate operating mechanisms 4, 5 respectively regulate the displacement volumes of the pumps 2, 3 or the tilting angles of swash plates (or bent axes). A fuel injection pump of the internal combustion engine 1 supplies a desired amount of fuel to the internal combustion engine 1 upon operation of a rack mounted therein. A sensor 7 is provided for sensing an accelerator operation of the internal combustion engine 1 or manipulated variable position of a throttle lever, not shown. Sensors 8, 9 sense manipulated variable positions of control levers, not shown, for respectively externally manipulating maximum values of a swash plate tilting of the variable displacement hydraulic pumps, 2, 3. A sensor 10 senses an output speed of the internal combustion engine 1, and a sensor 11 senses a rack displacement of the fuel injection pump 6. A control unit 12 for the internal combustion engine 1 is operative to supply a rack operating signal 12a to the fuel injection pump 6 and an engine speed deviation signal 12b to a control unit 13 for the variable displacement hydraulic pumps 2, 3 based on an accelerator operation signal or a throttle lever manipulated variable signal 7a (a target speed of internal combustion engine 1) from sensor 7, an engine output speed signal 10a from sensor 10 and a rack displacement signal 11a from sensor 11.

The control unit 13 for the variable displacement hydraulic pumps 2, 3 supplies a swash plate operating signal 13a for the hydraulic pump 2 and a swash plate operating signal 13b for the hydraulic pump 3 to the respective pump swash plate operating mechanisms 4, 5 based on an external operating signal 8a for the swash plate tilting of the hydraulic pump 2, an external operating signal 9a for the swash plate tilting of the hydraulic pump 3, a swash plate tilting signal 4a of the hydraulic pump 2, a swash plate tilting signal 5a of the hydraulic pump 3, a discharge pressure signal 14a of the hydraulic pump 2 sensed by a pressure sensor 14, a discharge pressure signal 15a of the hydraulic pump 3 sensed by a pressure sensor 15 and the speed deviation signal 12b supplied from the control unit 12 for the internal combustion engine 1. An amount of fuel injection to the internal combustion engine 1 is in functional relationship to a displacement of a rack 16 and, as shown most clearly in FIG. 2, the rack 16 is driven by an actuating device including a movable coil 17 yoke 18, a permanent magnet 19, and a rack return spring 20. A current amplifier 21 receives the rack operating signal 12a from the control unit 12 and converts the same into a DC signal or pulse duration modulated signal 21a to drive the movable coil 17. The rack displacement sensor 11 provides an output which is fed back as a rack displacement signal 11a to the control unit 12 through an amplifier or a waveform shaping circuit 22.

Figure 3:
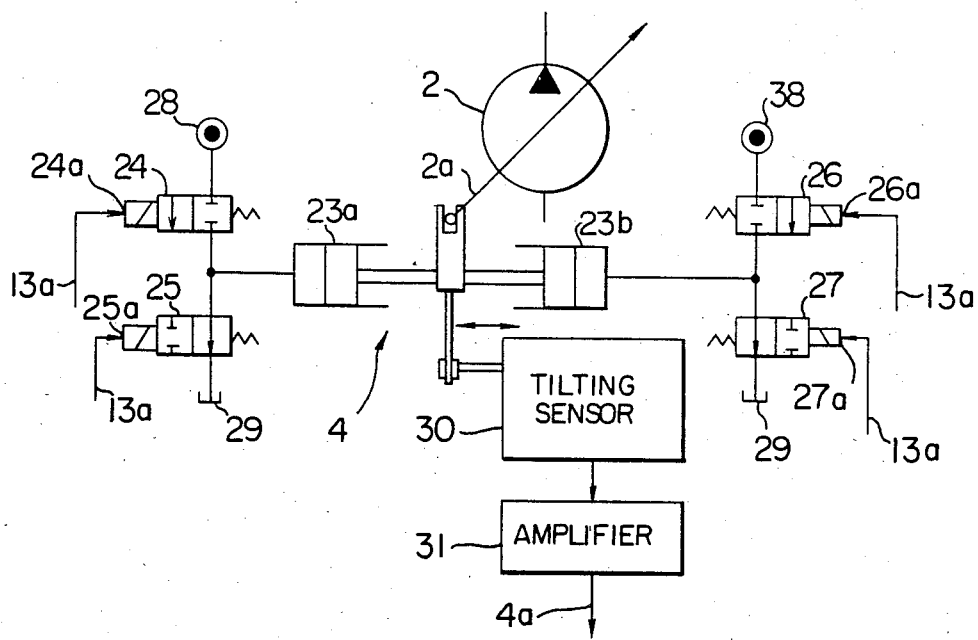
FIG. 3 is a schematic view of the swash plate operating mechanism in for the hydraulic pumps of FIG. 1.

As shown most clearly in FIG. 3, a swash plate 2a of the hydraulic pump 2 is driven by hydraulic cylinders 23a, 23b controlled by four two-position, two-way electromagnetic valves 24–27. More specifically, when solenoids 24a, 25a of the electromagnetic valves 24, 25 are energized by the swash plate operating signal 13a, hydraulic fluid from a pilot fluid pressure source 28 acts on the cylinder 23a and the cylinder 23b is communicated with a tank 29, so that the swash plate 2a of the hydraulic pump 2 has its tilting increased. Conversely, when solenoids 26a, 27a of the electromagnetic valves 26, 27 are energized by the swash plate operating signal 13a, the hydraulic pump 2 has its swash plate tilting reduced. Upon the solenoids 25a, 27a being energized by the swash plate operating signal 13a, the electromagnetic valves 24–27 have their circuits all closed, so that the swash plate tilting of the hydraulic pump 2 remains unchanged. A sensor 30 senses a tilting of the swash plate 2a of the hydraulic pump 2, with an output signal of the sensor 30 being fed back as a swash plate tilting signal 4a to the control unit 13 of the pump through an amplifier or a waveform shaping circuit 31. The swash plate operating mechanism 5 of the hydraulic pump 3 is of the same construction as described in connection with the swash plate operating mechanism 4.

Figure 4:
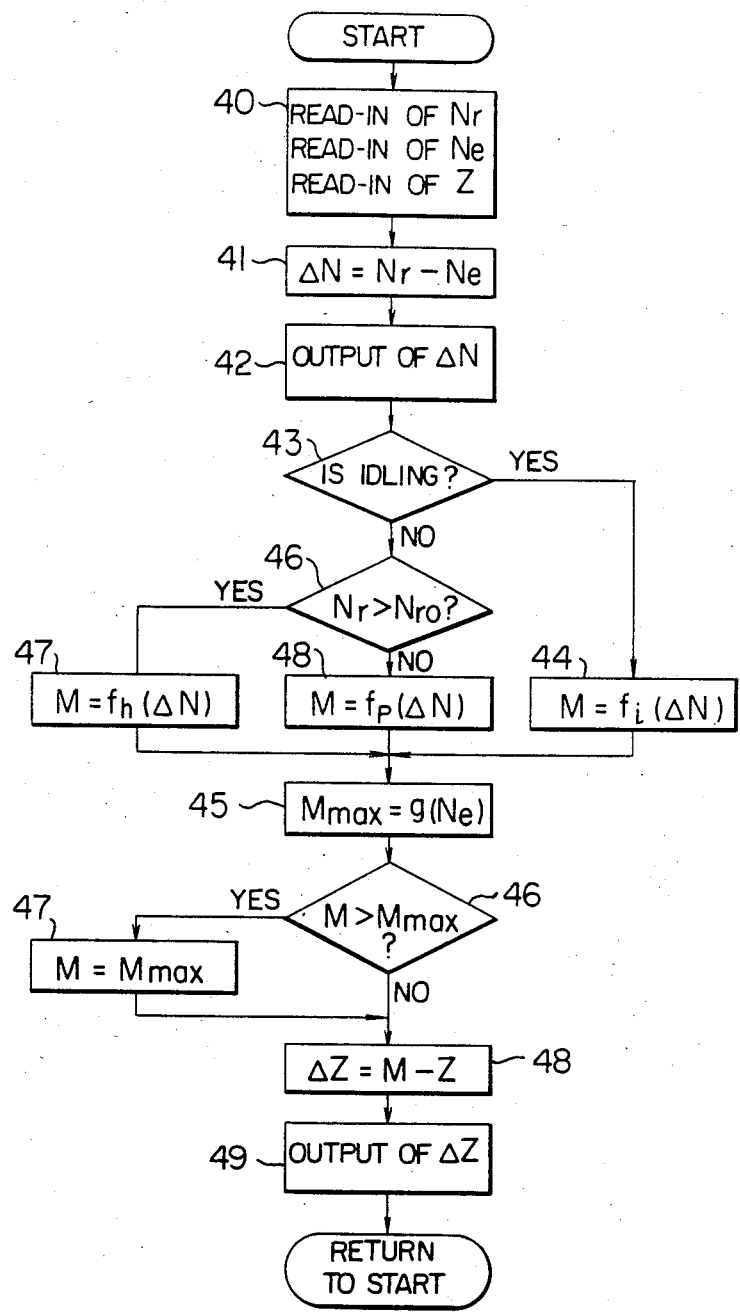
FIG. 4 is a flow chart of the internal combustion engine control method comprising one embodiment of the invention wherein a control unit is in the form of a microcomputer.
Figure 5:
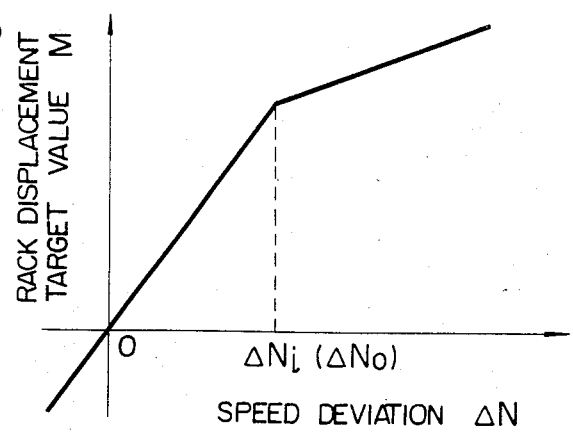
FIGS. 5-7 are graphs showing the functional relationship between the speed deviation of the internal combustion engine and the rack displacement target value in the control method shown in FIG. 4.

In the control method of the present invention, as shown most clearly in FIG. 4, in step 40, a target speed $N_r$, an output speed $N_e$ and a rack displacement Z are read in based on a throttle lever manipulated variable signal 7a, an output speed signal 10a and a rack displacement signal 11a, respectively, and stored in suitable addresses in a memory of a microcomputer. Then in step 41, a calculation is effected to obtain a speed deviation $\Delta N = N_r - N_e$ of the internal combustion engine 1 and the result is stored, and, in step 42, a value of the speed deviation $\Delta N$ is provided as a signal 12b to the control unit 13 for the pumps. Then in step 43, it is judged whether or not idling is indicated from the value of the target speed $N_r$. When idling is indicated, in step 44, an inquiry is addressed to a read-only memory (ROM) for a preset fuel injection target value for idling time or a rack displacement target value function $M = f_i(\Delta N)$, and a value for the rack displacement target value M for the idling time is decided before the process proceeds to step 45. The rack displacement target value function $M = f_i(\Delta N)$ is as shown in FIG. 5. More specifically, the rack displacement target value M increases substantially linearly at a certain rate until the speed deviation $\Delta N$ reaches $\Delta N_i$. Thereafter, the increase takes place at a lower rate. The increase may be in the form of a curve, in place of a straight line. When no idling is indicated in step 43, it is judged in step 46 whether speed is intermediate or high. When the speed is high, an inquiry is addressed in step 47 for a rack displacement target value function $M = f_h(\Delta N)$ for high speed, and a value for the rack displacement target value M for that time is decided before the process proceeds to step 45. When the speed is intermediate, an inquiry is addressed in step 48 for a rack displacement target value function $M = f_p(\Delta N)$ for intermediate speed, and a value for the rack displacement target value M for that time is decided before the process proceeds to step 45.

Figure 6:
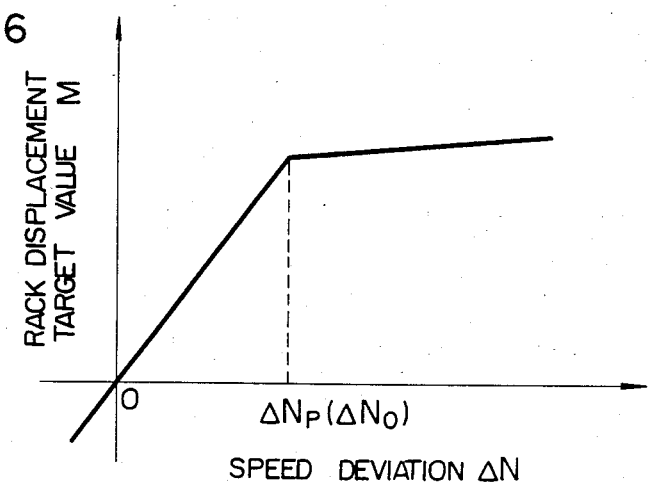
Figure 7:
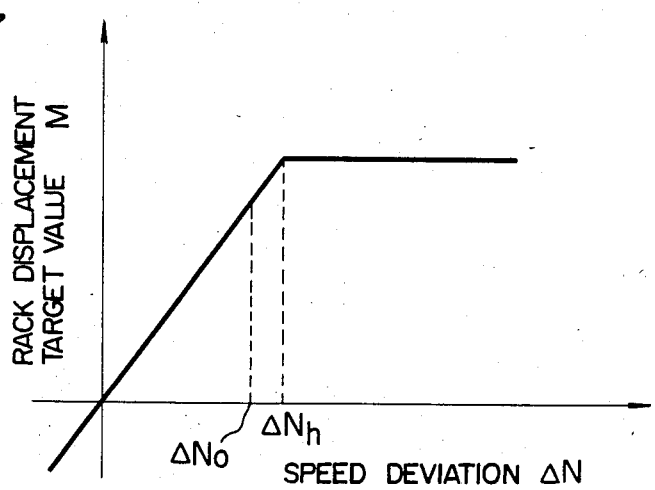

The rack displacement target value function $M = f_p(\Delta N)$ is as shown in FIG. 6. More specifically, the rack displacement target value M increases substantially linearly at a certain rate until the speed deviation $\Delta N$ reaches $\Delta N_p$. Thereafter, the increase takes place at a lower rate, and the rate of increase after $\Delta N_p$ is lower than the rate of increase of the rack displacement target value function $M = f_i(\Delta N)$ for idling time shown in FIG. 5. The rack displacement target value function $M = f_p(\Delta N)$ is as shown in FIG. 7. More specifically, the rack displacement target value M increases substantially linearly at a certain rate until the speed deviation $\Delta N$ reaches $\Delta N_h$. Thereafter, the value M shows a substantially constant maximum one. The increases in the rack displacement target values may be in the form of a curve in place of a straight line.

In the embodiment described hereinabove, three types of rack displacement target value functions for idling, intermediate speed and high speed have been prepared and are used in dependence upon the speed range of the target speed $N_r$. However, a rack displacement value may be determined by using one function as shown in FIG. 7 irrespective of the speed range. However, the illustrated embodiment in which different types of functions are used depending on the speed range is considered preferable. The reasons will be described by referring to FIGS. 8 and 9.

Figure 8:
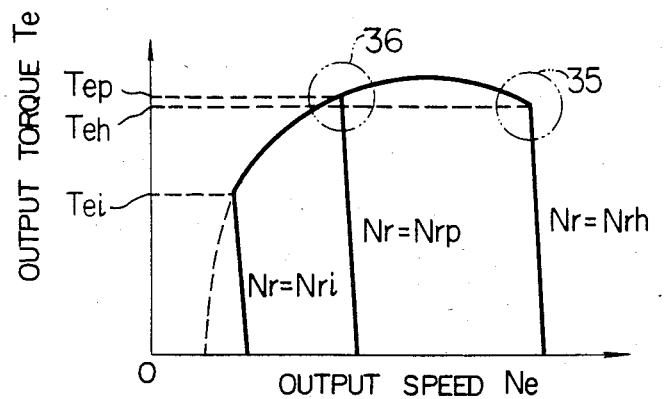
FIG. 8 is a graph showing the relationship between the engine output speed and the output torque establishd when the functional relationship of FIG. 7 is used.

When one function as shown in FIG. 7 is used for determining the rack displacement target value M, the relation between the output speed $N_e$ of the internal combustion engine and the output torque $T_e$ (output characteristic) will be as shown in FIG. 8. In FIG. 7, $\Delta N_0$ is a speed deviation that causes the input torque of the hydraulic pump to begin to decrease as subsequently to be described.

Figure 9:
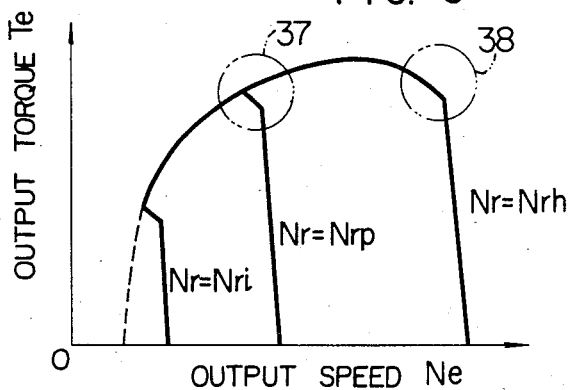
FIG. 9 is a graph showing the relationship between the engine output speed and the output torque established when the functional relationships shown in FIGS. 5 and 6 are used.

When the target speed $N_r$ of the internal combustion engine is high ($N_r = N_{rh}$), the output torque $T_e$ can become over $T_{eh}$ at $\Delta N > \Delta N_0$ as indicated by a dot-and-dash line 35 in FIG. 8 even if a torque reaction $T_p$ becomes over $T_{eh}$. Thus, no engine shutdown would occur even if the input torque decreasing rate of the hydraulic pump is not set at an inordinately high value or even if the tilting angle is not suddenly reduced. However, when the target speed is $N_r = N_{rp}$ (intermediate speed) as shown by the dot-and-dash line 36 in FIG. 8 or $N_r = N_{ri}$ (idling), the output torque $T_e$ cannot become over $T_{ep}$ or $T_{ei}$ when the torque reaction $T_p$ reaches $T_{ep}$ or $T_{ei}$. Thus, when the rack displacement target value M reaches the maximum value, the output torque would immediately decrease. Therefore, unless the input torque decreasing rate of the hydraulic pump is set at a high level or unless the tilting angle is suddenly reduced, engine shutdown would occur. Meanwhile, setting the input torque decreasing rate of the hydraulic pump at a high level is equivalent to setting the gain constant of a control system at a high level, thereby running the risk of causing oscillation of the system. Therefore, to avoid the aforesaid contradiction, the rack displacement target value M with respect to speed deviation $\Delta N$ slowly rises along an inclination when $\Delta N > \Delta N_0$ as shown in FIGS. 5 and 6. When this is the case, the output characteristic of the internal combustion engine 1 is as shown in FIG. 9. The output torque $T_e$ increases as the output speed $N_e$ decreases for a certain section from a point in time at which the input torque of the pump begins to decrease, so that no engine shutdown would occur and stability increases even if the input torque decreasing rate of the pump is not set at an inordinately high level. However, although this shows a good tendency when the speed is intermediate speed or idling as indicated by a dash-and-dot line 37 in FIG. 9, a disadvantage resides in the fact that the section for the torque to rise becomes longer than is necessary as indicated by a dash-and-dot line 38 in FIG. 9 when the speed is high speed, and thus the effective hosepower is correspondingly reduced correspondingly. Thus, it is preferable that the characteristics as shown in FIGS. 5 and 6 be used at idling or when the speed is intermediate speed, respectively, and the characteristic as shown in FIG. 7 be selected for high speed.

In step 45, an inquiry is addressed based on the output speed $N_e$ for an allowable maximum value $M_{max} = g(N_e)$ of the rack displacement target value M written beforehand to the ROM, and in step 46, the rack displacement target value M is compared with the allowable maximum value $M_{max}$ thereof. When $M > M_{max}$, the value of M is replaced by that of $M_{max}$ in step 47, and the process proceeds to step 48. When $M \leq M_{max}$, the value of M remains unchanged and the process proceeds to step 48.

Figure 10:
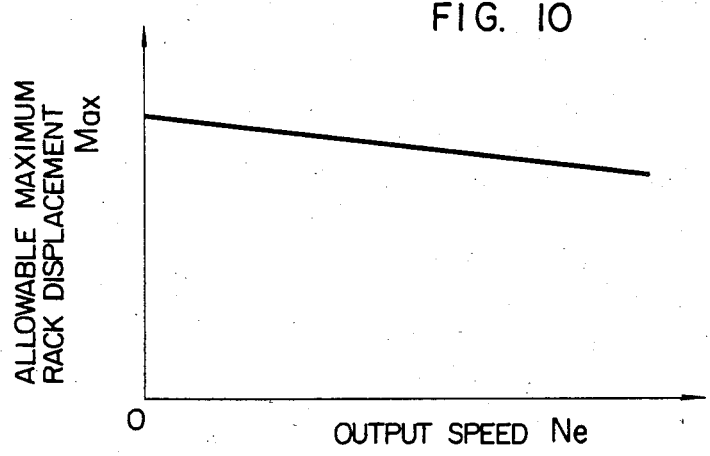
FIG. 10 is a graph showing the relationship between the engine output speed and an allowable maximum value of the rack displacement target value for obtaining the compensating characteristic of the internal combustion engine in the control method of FIG. 4.

The allowable maximum value $M_{max} = g(N_e)$ is related to the output speed $N_e$ in such a manner that it decreases as shown in FIG. 10. Generally, an amount of fuel injection per cycle by the fuel injection pump 6 increases with increase in the speed of the internal combustion engine 1 when rack displacement remains unaltered. Thus, the output torque decreases as the speed drops. If the maximum value of rack displacements is set at a high level to ensure that enough torque is obtained in a low speed range, the fuel injection in a high speed range would become too great and incomplete combustion would result, with the internal combustion engine 1 emitting black smoke. To obviate this problem, one has only to set the output speed $N_e$ and the maximum value $M_{max}$ of rack displacement target value to be related to each other in a manner to have a rightward drop characteristic as shown in FIG. 10. This characteristic is referred to as an compensating characteristic. To obtain this characteristic, mechanisms of very complex construction have been used in combination in case of a mechanical governor. However, the end can be readily attained by using an electronic device, particularly a microcomputer as a control unit.

Figure 2:
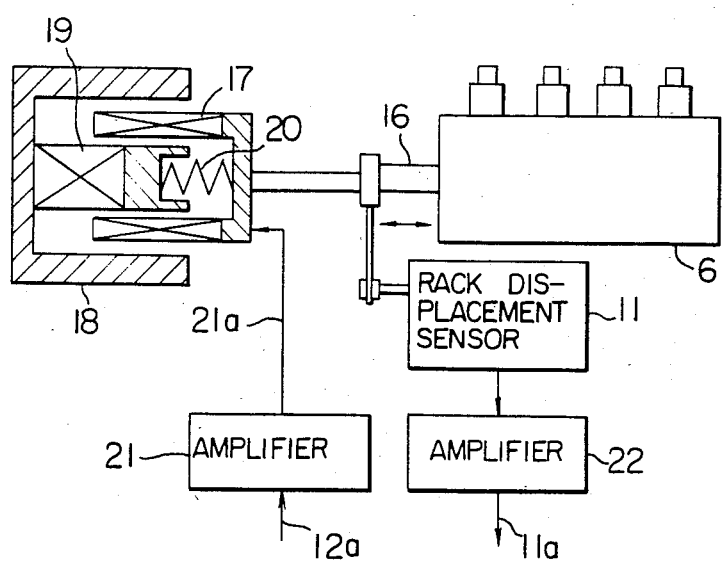
FIG. 2 is a schematic view of the rack drive device for a fuel injection pump of the internal combustion engine of FIG. 1.

As described hereinabove, after the fuel injection target value or rack displacement target value M is decided, a calculation is effected in step 48 to obtain a rack displacement deviation $\Delta Z$ from the rack displacement target value M and rack displacement Z, and in step 49 the value obtained is supplied to the current amplifier 21 shown in FIG. 2 as the rack operating signal 12a, and the process returns to the start.

Figure 11:
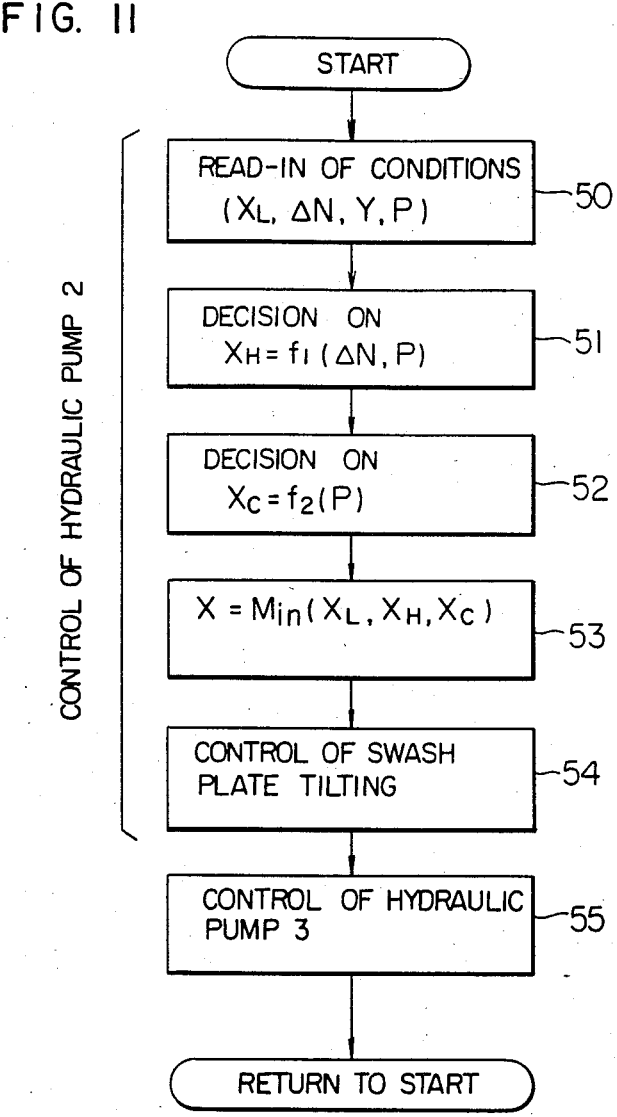
FIG. 11 is a flow chart of the control method of the hydraulic pumps comprising one embodiment of the invention.

As shown in FIG. 11, in step 50, conditions on the hydraulic pump 2 such as an external manipulated variable $X_L$, a swash plate tilting Y and a discharge pressure P of the hydraulic pump 2 as well as a speed deviation $\Delta N$ of the internal combustion engine 1 are read in and stored based on signals 8a, 4a, 14a and 12b, respectively.

Then in step 51, a displacement volume target value of swash plate tilting target value $X_H$ is decided based on an input torque control function $f_1(\Delta N, P)$. The process for deciding the swash plate tilting target value $X_H$ will be described by referring to the input torque control function shown in FIG. 12.

Figure 12:
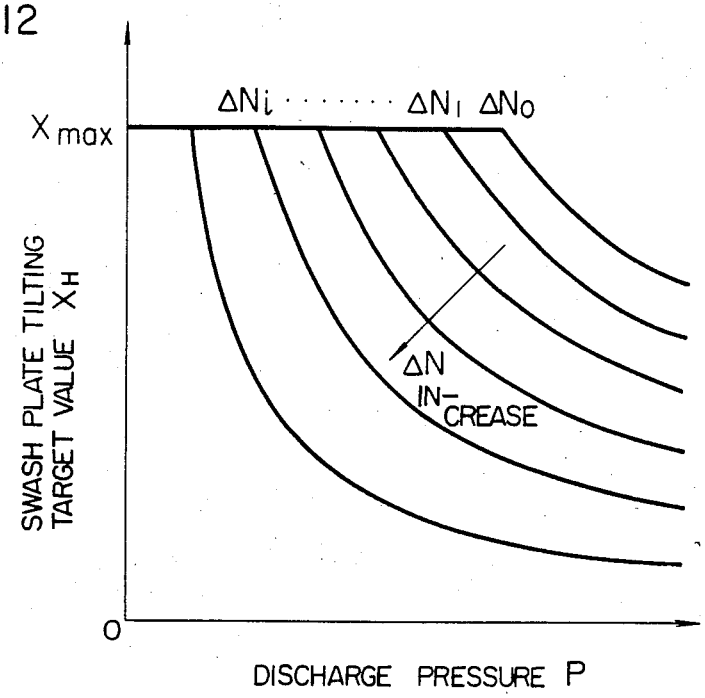
FIG. 12 is a graph showing the functional relationship between the discharge pressure, speed deviation and hydraulic pump swash plate tilting target value in the control method of FIG. 11.

The input torque of the hydraulic pump 2 is proportional to the product of the swash plate tilting Y and the discharge pressure P of the pump 2. Thus, it is the input torque control function $f_1(\Delta N, P)$ that is used to control the swash plate tilting in such a manner that the product of the swash plate tilting Y and the discharge pressure P is reduced as the output speed $N_e$ of the internal combustion engine 1 drops or the speed deviation $\Delta N$ increases. In FIG. 12, the abscissa represents the discharge pressure P and the ordinate indicates the swash plate tilting target value $X_H$ based on the input torque control function $f_1(\Delta N, P)$. The input torque control function $f_1(\Delta N, P)$ comprises a hyperbola a quasi-hyperbola group which satisfies the following relationship:

$$P \cdot X_H \approx T_{max} - K(\Delta N - \Delta N_0)$$

when $\Delta N < \Delta N_0$. Thus, it is possible to decide upon an optimum swash plate tilting target value $X_H$ from the input torque control function $f_1$ by using the discharge pressure P and the speed deviation $\Delta N$ of the internal combustion engine 1.

Figure 13:
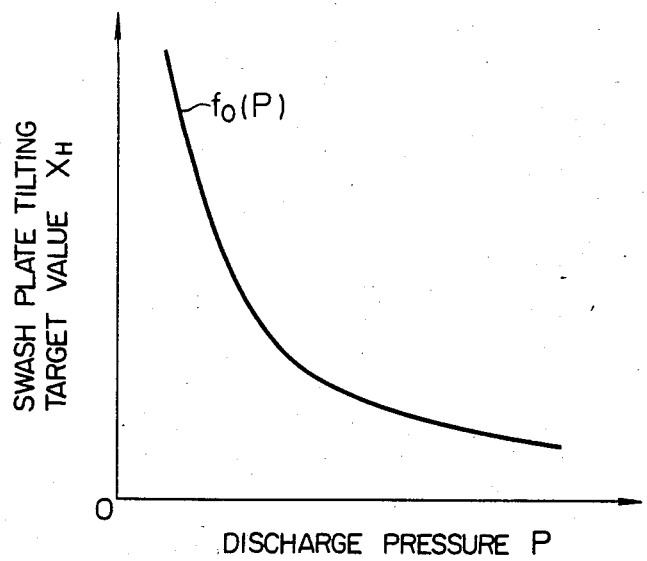
FIG. 13 is a graph showing a reference for a hydraulic pump input constant curve used for approximately realizing the relationship of FIG. 12.

The input torque control function $f_1(\Delta N, P)$ may be such that a plurality of function tables corresponding to the speed deviations $\Delta N$ such as $f_{10}(\Delta N_0, P)$, $f_{11}(\Delta N_1, P) \ldots f_{1i}(\Delta N_i, P)$ is stored in the memory beforehand so as to calculate the desired swash plate tilting target value from the function table corresponding to a speed deviation closest to the actual speed deviation by means of linear interpolation. Alternatively, the following approximation process may be used. One hyperbola $f_0(P)$ as shown in FIG. 13 is translated in accordance with the value of the speed deviation $\Delta N$ to obtain the swash plate tilting target value $X_H$ corresponding to the discharge pressure P and speed deviation $\Delta N$. The process of translation used at this example will be described by referring to FIG. 14.

Figure 14:
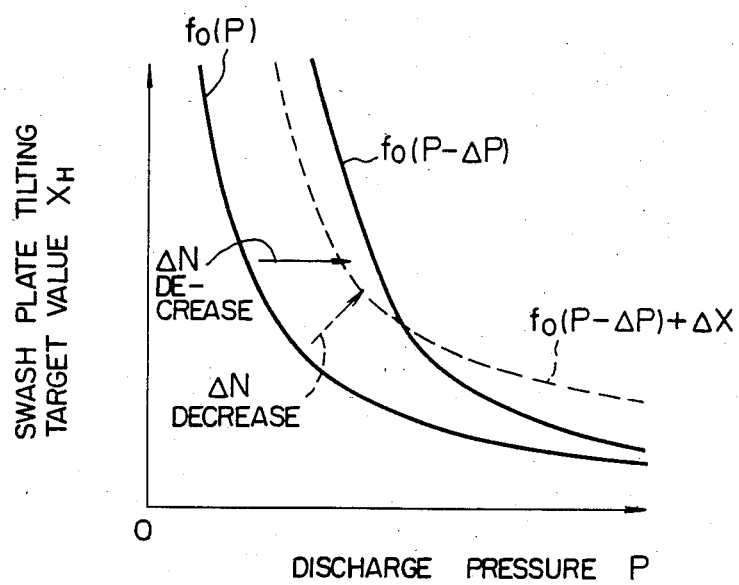
FIG. 14 is a graph in explanation of the method for translating the graph of FIG. 13.

In FIG. 14, assume that a hyperbola $f_0(P)$ serves as a reference, in which such relation between the pressure P and the swash plate tilting target value $X_H$ as renders the absorption torque T of the hydraulic pump 2 a minimum absorption torque $T_0$ is used. If an attempt is made to obtain $X_H$ from the function $f_0$ by substituting $P' = P - \Delta P$ for the pressure signal P and using a function $\Delta P = g_1(\Delta N)$ in which $\Delta P$ may vary depending on the speed deviation $\Delta N$ of the internal combustion engine, then $f_0(P)$ would be shifted by $\Delta P$ along the abscissa as a curve indicated by $f_0(P-\Delta P)$ in FIG. 14. This curve becomes quite different from a line which represents a substantially constant absorption torque. Thus, the swash plate tilting target value $X_H$ is corrected by using a function $\Delta X = g_2(\Delta N)$ in which $\Delta X$ may vary depending on the speed deviation $\Delta N$. That is, a calculation may be effected in accordance with the following relationship:

$$X_H = f_0(P - \Delta P) + \Delta X$$

to shift the curve $f_0(P-\Delta P)$ along the ordinate by $\Delta X$. The curve obtained as a result is shown in a broken line in FIG. 14. If translation is effected in this way, it is possible to obtain fairly good absorption torque constant curves corresponding to the respective speed deviations.

Figure 15:
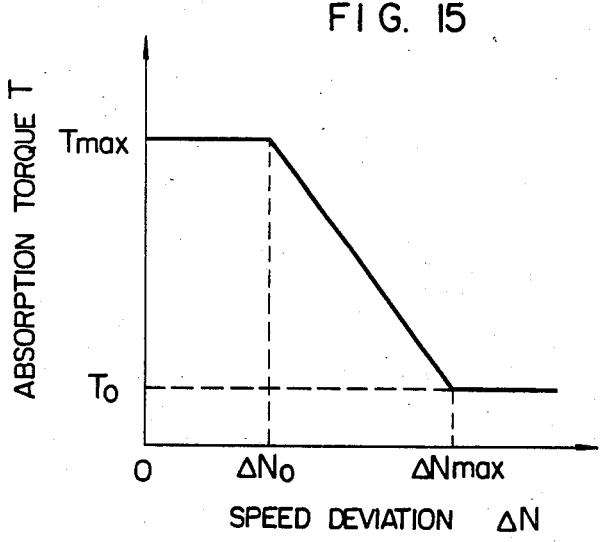
FIG. 15 is a graph showing one example of the relationship between the engine speed deviation and the hydraulic pump input torque in the control method of FIG. 11.
Figure 16:
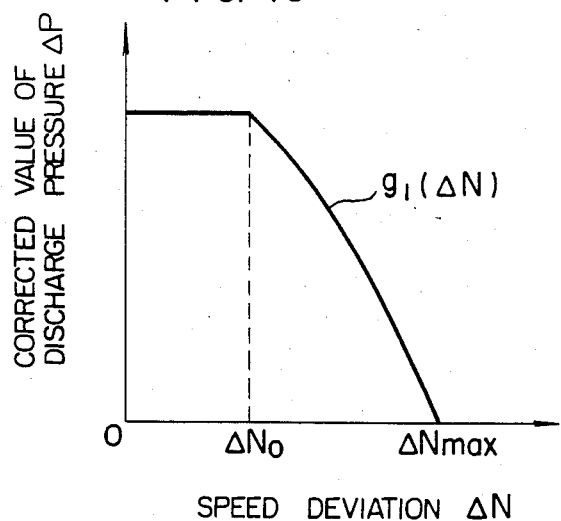
FIG. 16 is a graph showing the relationship between the speed deviation and a corrected value of the discharge pressure for obtaining the relation of FIG. 15.
Figure 17:
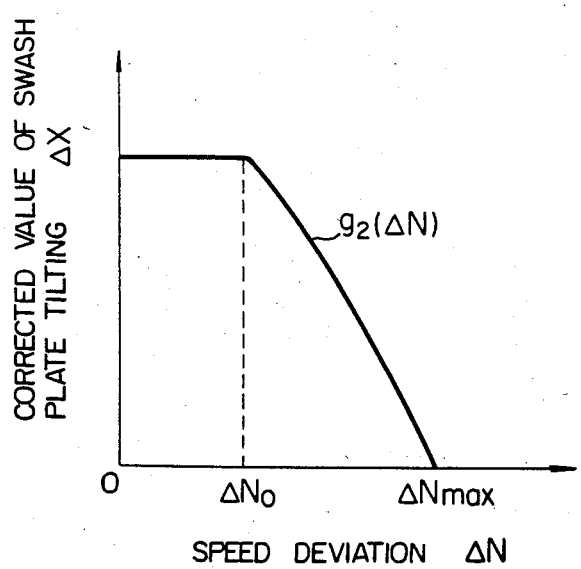
FIG. 17 is a graph showing the relationship between the speed deviation and a corrected value of the pump swash plate tilting for obtaining the relationship of FIG. 15.
Figure 18:
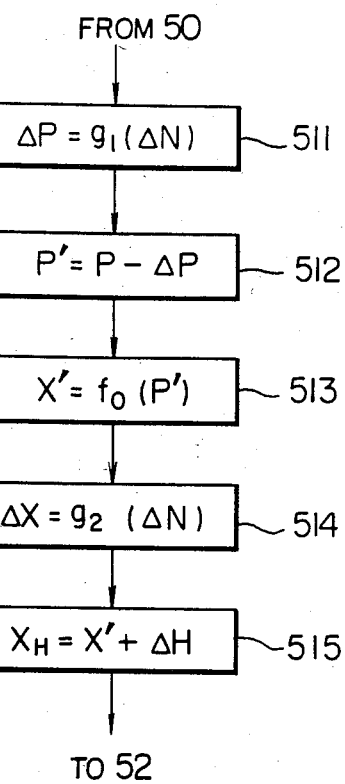
FIG. 18 is a flow chart for showing the process for deciding a swash plate tilting target value based on the graphs of FIGS. 13-17.

Thus, in order to effect control in such a manner that the absorption torque T of the hydraulic pump 2 decreases as shown in FIG. 15 as the speed deviation of the internal combustion engine 1 increases, correction functions $\Delta P = g_1(\Delta N)$, $X = g_2(\Delta N)$ can be those characteristics as shown in FIGS. 16 and 17, respectively. If a straight line is used as an input torque control function $f_o$ serving as a reference in place of a hyperbola, then an error from the input torque constant curve becomes larger, but stability is yet improved as compared with a process of the prior art which controls the swash plate tilting of a hydraulic pump irrespective of the discharge pressure. Therefore, the use of a straight line as an input torque control function $f_0$ is to be considered within the essentials of the invention.

Returning to FIG. 11, and, in particular, the control process step 52, after the swash plate tilting target value $X_H$ concerning the input torque is decided upon from the input torque control function $f_1(\Delta N, P)$, the value obtained is temporarily stored and the process proceeds to step 52.

Figure 19:
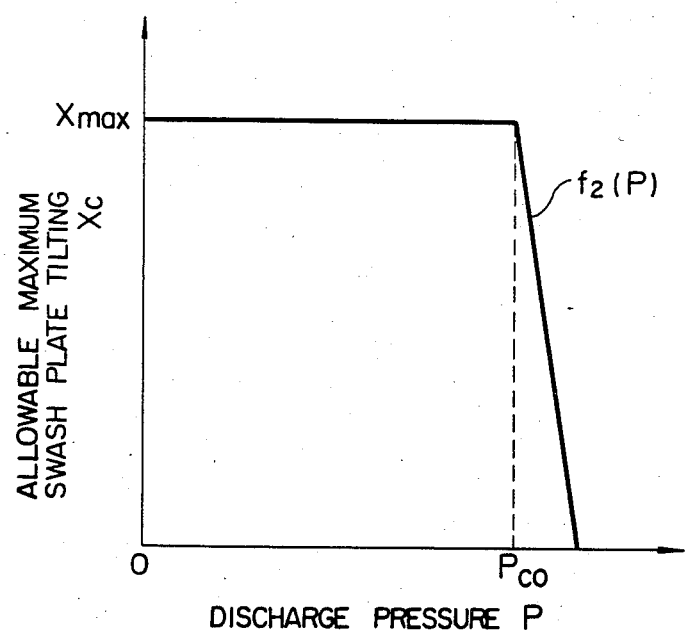
FIG. 19 is a graph showing a function for obtaining an allowable maximum value of the discharge pressure.

In step 52, an allowable maximum swash plate tilting target value, in case of occurrence of inordinate rise in the discharge pressure P, serves to reduce the swash plate tilting Y irrespective of the target value $X_H$ of restricting the lever manipulated variable $X_L$ or input torque to thereby prevent an energy loss that might occur as pressure fluid is released through a relief valve, not shown, of a hydraulic circuit. That is, a function $X_C = f_2(P)$ as shown in FIG. 19 is stored in the memory, and the target value $X_C$ of the allowable maximum swash plate tilting in conformity with the discharge pressure is decided by inquiring for this function. Then in step 53, the target values $X_L$, $X_H$ and $X_C$ of the swash plate tilting decided by the aforesaid process are compared and the minimum value is selected as a final target value X of the swash plate tilting, and the process switches to a control of a swash plate tilting in step 54.

Figure 20:
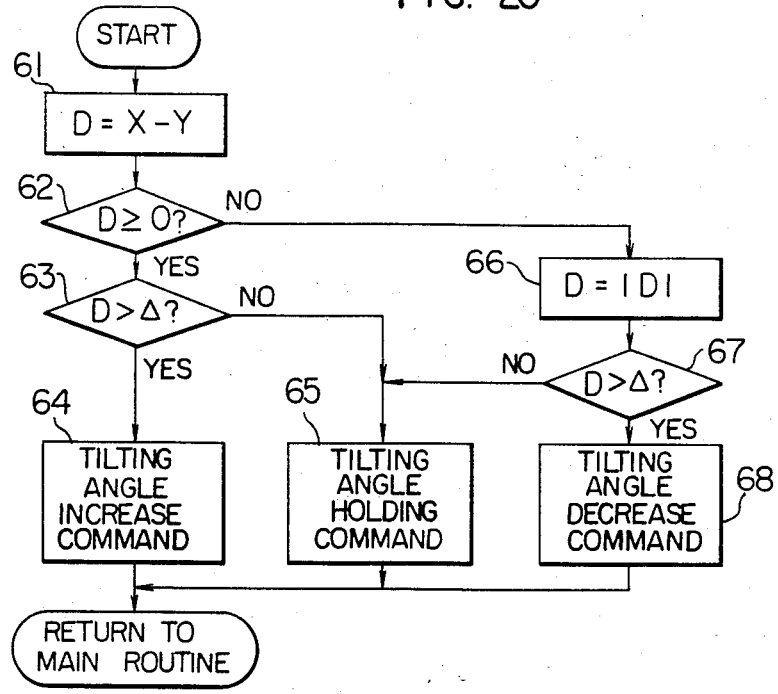
FIG. 20 is a flow chart for controlling the swash plate operating mechanism in the control method of FIG. 11.

A pump control routine practised in step 54 will be described by referring to FIG. 20. First, in step 61, a calculation is carried out to obtain a tilting angle deviation $D = X - Y$ from the swash plate tilting target value X of the pump 2 and the tilting Y of the pump 2.

Then, in step 62, it is judged whether the tilting angle deviation D of the pump 2 is positive or negative. If it is judged to be positive, then the tilting deviation D is checked in step 63 if it is greater than a dead zone $\Delta$. If $D > \Delta$, then the process proceeds to step 64 in which a command for increasing the tilting angle of the pump 2 (a command for energizing the solenoids 24a and 25a of the electromagnetic valves 24 and 25 respectively shown in FIG. 3) is provided, and the process returns to the main routine. If $D \leq \Delta$ in step 63, then the process proceeds to step 65 in which a command for holding the tilting angle of the pump 2 (a command for energizing the solenoids 25a and 27a of the electromagnetic valves 25 and 27 respectively shown in FIG. 3) is provided, and the process returns to the main routine. If the value of the tilting angle deviation D is negative in step 62, then the process proceeds to step 66 in which the absolute value of the tilting deviation D is taken and $D = |D|$ anew. Then in step 67, the tilting deviation D and the dead zone $\Delta$ are compared with each other as to their size. When $D > \Delta$, then the process proceeds to step 68 in which a command for decreasing the tilting angle of the pump 2 (a command for energizing the solenoids 26a and 27a of the electromagnetic valves 26 and 27 respectively shown in FIG. 3) is provided, before returning to the main routine. When $D \leq \Delta$ in step 67, the process proceeds to step 65 in which a command for holding the tilting angle of the pump 2 is provided, before returning to the main routine. The description so far made refers to the pump 2. The control routine for the pump 3 is identical with that for the pump 2, so that the description thereof will be omitted.

The aforesaid description shows control of the hydraulic pump 2 effected in steps 50-54 shown in FIG. 11. The same process is followed in step 55 for the pump 3, and when the control is finished the process returns to the start to repeat the same process once again. If the absorption horsepower for the pumps 2, 3 are to be distributed equally to each other, the $X_H$ decided in step 51 can be used as it is in step 55. Thus, the process for deviding $X_H$ for the step 55 can be eliminated.

In the foregoing description, what is referred to as a single tilting type pump has been described in which the swash plate tilting Y has only a positive value. It is to be understood, however, that the same concept applies to a drive system for a closed hydraulic circuit in which what is referred to as a dual tilting type pump is used.

In order to enable the contents of the invention to be readily understood, the control unit 12 for the internal combustion engine and the control unit 13 for the pumps have been shown and described as being separate hardwares in the embodiment shown and described hereinabove. However, they may be formed into the same hardware by using a single microcomputer.

In order to enable the description of the control method according to the invention to be readily understood, since the control method requires logical control, the invention has been described by referring to an embodiment in which microcomputers are used as control units. However, the control method according to the invention can be readily realized by using analog circuits and logical devices.

A second embodiment of the invention will now be described in which control of the displacement volume of each hydraulic pump in the control method and apparatus of the invention is effected by using fluid circuits.

Before describing the second embodiment, in view of the importance of effecting control of an internal combustion engine in the invention by determining a fuel injection target value which is in predetermined functional relation to a speed deviation, the method of controlling an internal combustion engine by using a mechanical all-speed governor of the prior art disclosed in the SAE Paper 760687 referred to hereinabove as well as the problems thereof will be described by referring to FIGS. 21-23.

Figure 21:
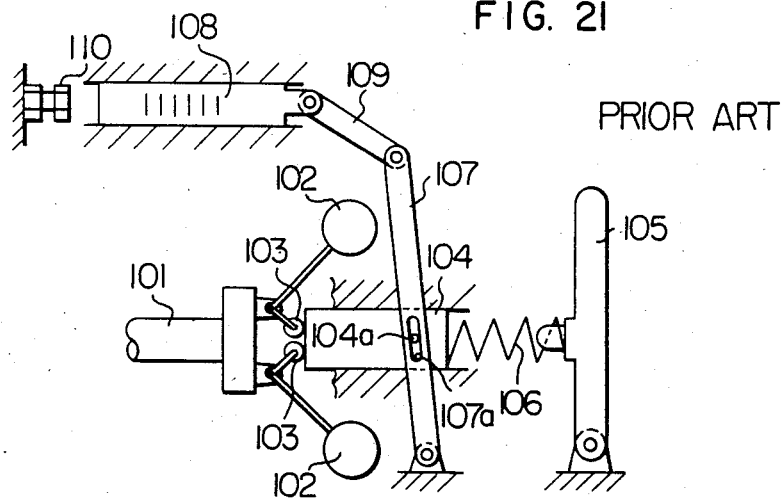
FIG. 21 is a schematic view of a mechanical all-speed governor used with fuel injection control device of the prior art.

FIG. 21 shows a prior art mechanical all-speed governor which includes a cam shaft 101 connected to an output shaft of the engine through gears, with flyweights 102 being pivotally connected to an end portion of the cam shaft 101 to sense a variation in the load and rollers 103 mounted on the flyweights 102. A slidably supported shifter 104 is provided, and a throttle lever sets a target speed, with a spring 106 being mounted between the shifter 104 and throttle lever 105. A pivotally supported floating lever 107 is formed with a slot 107a receiving a projection 104a of the shifter 104 therein. A rack 108 is connected to the fuel injection pump for controlling an amount of fuel injection, with a link 109 being pivotally connected at opposite ends to the floating lever 107 and rack 108 respectively. A stopper 110 regulates a maximum displacement of the rack 108.

In the mechanical all-speed governor of FIG. 21, when the manipulated variable (target speed) of the throttle lever 105 remains constant, a decrease in the output speed of the engine caused by a variation in load causes a decrease in the speed of the cam shaft 101. As a result, the centrifugal forces acting on the flyweight 102 decrease and the shifter 104 is urged to move leftwardly by the spring 106. This moves the rack 108 leftwardly or increases the displacement of the rack 108, so that the fuel injection by the fuel injection pump increases and the output torque of the engine increases. Upon the rack 108 abutting against the stopper 110, the displacement of the rack 108 is maximized and the fuel injection and output torque are also maximized. Conversely, when the output speed increases, the output torque decreases by an action in reverse of the aforesaid action. Thus, when the manipulated variable (target speed) of the throttle lever 105 remains constant, the output speed is maintained substantially constant while the displacement of the rack 108 is controlled in a manner to deliver an output torque commensurate with the load. Also, when the throttle lever 105 is rotated in a direction in which the spring 106 is contracted or the manipulated variable (target speed) of the throttle lever 105 is increased, the shifter 104 is urged by the spring 106 with a greater biasing force to move leftwardly, thereby temporarily greatly increasing the displacement of the rack. However, this is accompanied by an increase in output speed which increases the centrifugal forces acting on the flyweights 102, thereby generating a force tending to push the shifter 104 back rightwardly. This decreases the displacement of the rack 108 and the output speed becomes constant as the centrifugal forces of the flyweights 102 and the biasing force of the spring 106 balance, so that the output speed is maintained at a value commensurate with the manipulated variable (target speed) of the throttle lever 105. Conversely, when the manipulated variable (target speed) of the throttle lever 105 decreases, the output speed can be likewise maintained at a value commensurate with the manipulated variable.

Thus, in the mechanical all-speed governor described hereinabove, control of output torque is effected in such a manner that the biasing force of the spring 106, having its displacement adjusted by the manipulated variable (target speed) of the throttle lever 105 and the centrifugal forces of the flyweights 102 rotated in conjunction with the internal combustion engine, are made to oppose each other through the shifter 104 and a displacement of the rack 108 decided as the force balance determines the amount of fuel injection. That is, when output speed undergoes a change due to a variation in load or target speed is altered by manipulating the throttle lever 105, the change is converted into a change in the centrifugal forces of the flyweights 102 and the biasing force of the spring 106 to control the displacement of the rack 108 or the amount of fuel injection.

However, the centrifugal forces of the flyweights 102 would naturally be proportional to the square of the output speed, but not linear with respect to the output speed. Thus, the displacement of the rack controlled for a change in output speed would increase or decrease in proportion to the square of the output speed depending on the size thereof. This point will be discussed with regard to the control of the rack displacement effected in accordance with a variation in load while maintaining the manipulated variable (target speed) of the throttle lever 10 constant. As shown in FIG. 22, when the target speed is set at Na, the rack displacement shows a change as indicated by a straight line a. Likewise, when it is set at Nb, Nc and Nd, it shows changes as indicated by straight lines b, c and d, respectively. Thus, if the target speed is Na, the rack displacement M may show a maximum value $M_{max}$ at a point A when a deviation of the output speed is $\Delta N_1$, but if the target speed is changed from Na to Nb, Nc and Nd, then the rack displacement M with the same deviation $\Delta N_1$ does not show a maximum value $M_{max}$ as indicated at points B, C and D but shows successively decreasing values as indicated at points B', C' and D'.

Figure 23:
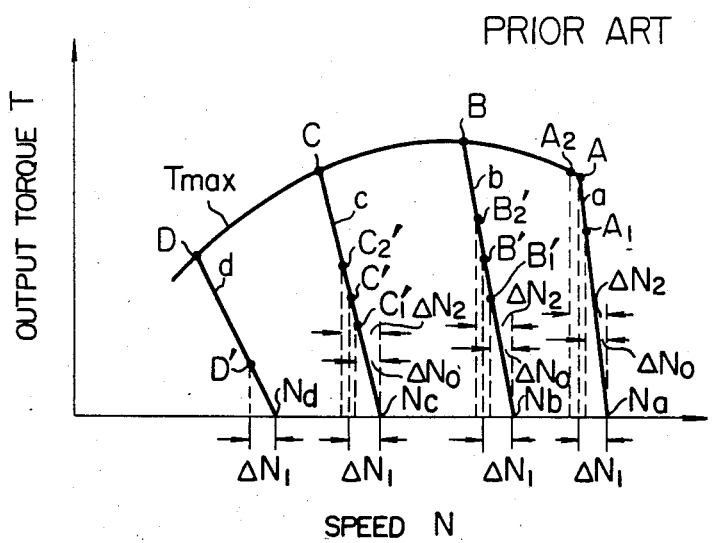
FIG. 23 is a graph similar to that of FIG. 22 but showing the output torque characteristics.

The output torque of an internal combustion engine 1 may vary depending on the fuel injection and FIG. 23 shows the relationship in terms of torque curves. As shown in FIG. 23, the changing rate of the output torque with respect to a change in speed may vary depending on the value of a target speed. Even if the target speed and output speed have the same deviation, the output torque may show different values depending on target speed, so that the value obtained by comparing the target speed with the output speed does not accurately reflect the operation characteristics of the engine such as output torque.

Also, in the mechanical all-speed governor referred to hereinabove, the spring constant of the spring 106 may show variations at the time of production, and the flyweights 102 may show variations in weight and the arm length at the time of production and assembly. These parts also may undergo change with time. Thus, the straight line a in FIG. 22 representing a rack displacement characteristic obtained when the manipulated variable of the throttle lever 105 is set in a manner to render the target speed Na, for example, and thus the straight line a in FIG. 23 representing an output torque characteristic has substantial variations in gradient. Consequently, the difference $\Delta N_1$ between the target speed Na and the output speed at a point A at which the rack displacement and output torque T show maximum values or the operating range of the governor shows substantial variations. For example, when the target speed is 2,000 rpm, the governor operating range is about 150 rpm. However, the governor operating range usually has errors of about ±50 rpm. Also, the setting of a free length of the spring 106 has variations which exert influences on the setting of a target speed by the throttle lever 105. For example, even if the target speed is set at 2,000 rpm, the actual output speed at no load has errors of about ±50 rpm with respect to 2,000 rpm.

Thus, in this sense also, a comparison of the target speed with the output speed shows that the deviation of these values does not accurately represent the operating characteristics of the internal combustion engine such as output torque.

The facts described hereinabove give rise to the following problems in a control method of the prior art relying on the conventional engine speed sensing system.

To maximize engine output without causing overload to an internal combustion engine with respect to all the manipulated variables (target speeds) of the throttle lever, it is ideal that an output torque and a load (input torque of the hydraulic pump, etc.) be made to balance on a maximum torque curve $T_{max}$ at points A, B, C and D in FIG. 23. Thus, when the load is so large that it exceeds the points on the maximum torque curve $T_{max}$, it is necessary to reduce the load. The input torque of the hydraulic pump which represents a main load is expressed by the product of the discharge rate and discharge pressure of the hydraulic pump, and the discharge rate of the hydraulic pump is proportional to the swash plate tilting angle in a swash plate type pump. Thus, to reduce the load, one has only to reduce the discharge rate of the hydraulic pump or the swash plate tilting angle. (Additionally, when the work done by a hydraulic cylinder or an actuator increases, a circuit pressure increases which is manifested as an increase in the discharge pressure of the hydraulic pump and hence an increase in load).

However, in the method of reducing a load torque by decreasing the discharge rate of the hydraulic pump, for example, after sensing that each of the points A, B and C is reached, the gain of the control system would have to be made very great, so that what is generally referred to as hunting would occur in which a normal output speed and a load torque (such as the discharge rate of the hydraulic pump) would periodically fluctuate. If the gain of the control system were reduced, it would of course be impossible to reduce the load immediately after sensing the output torque reaching each of the points A, B and C, and the output speed would suffer a great reduction in the event that a sudden fluctuation occurs in the load.

A proposal has thus been made, as disclosed in the aforementioned SAE Paper 760687, to effect control of the discharge of the hydraulic pump, for example, in such a manner that the load, such as input torque of the variable displacement hydraulic pump, decreases before the output torque reaches each of the points A, B and C and the load is minimized when such points are slightly exceeded.

More specifically, in the control method of the prior art, the point at which the load begins to decrease is selected such that by using as a reference, for example, the operating characteristic represented by the straight line a in FIG. 23 and obtained when the manipulated variable of the throttle lever, is set in such a manner as to give a value of Na to target speed, a point $A_1$ is selected at which the output torque is slightly lower than at a maximum output torque point A in that operating condition, and the point at which the load is minimized is selected at a point $A_2$ at which the output torque is slightly higher than at point A. Point $A_1$ represents a speed deviation $\Delta N_o$ slightly smaller than the speed deviation $\Delta N_1$ at point A and point $A_2$ represents a speed deviation $\Delta N_2$ slight-larger than the speed deviation $\Delta N_1$. Thus, control is effected when the speed deviation reaches $\Delta N_o$ and $\Delta N_2$ by monitoring same.

Thus, in the control method of the prior art, the load is controlled in such a manner that, when the target speed is set at Na and the engine is operated along the straight line a, the input torque of the variable displacement hydraulic pump begins to decrease when the output torque reaches point $A_1$ and the speed deviation reaches $\Delta N_o$, and the input torque of the hydraulic pump is minimized when the input torque reaches point $A_2$, no matter how suddenly the load increases. Thus, the output speed and the load would balance in the close vicinity of point A.

However, in the control method of the prior art using a mechanical all-speed governor as described hereinabove, the output torque would have a different characteristic depending on the position at which the target speed is set, even if there is no difference in speed deviation. More specifically, referring to FIG. 23, the output torque would show a change as represented by a straight line b when the target speed is set at Nb and the output torque would show a change as represented by a straight line c when the target speed is set at Nc, and the output torques showing changes along the straight lines b and c would be at points B and C at which it is maximized but at points B' and C' at which the values are slightly smaller than at points B and C, when the speed deviation becomes $\Delta N_a$. Thus, the points at which the speed deviation becomes $\Delta N_o$ and $\Delta N_2$ as monitored in the aforesaid method of the prior art would be $B_1'$ and $C_1'$ and $B_2'$ and $C_2'$ respectively which do not coincide with maximum output torque points, thereby making it impossible to make use of the engine output to a maximum at these target speed setting points.

Figure 22:
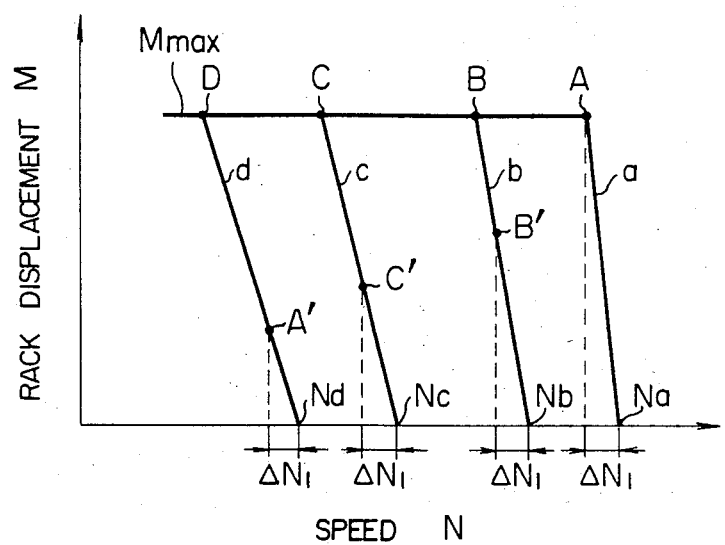
FIG. 22 is a graph showing the rack displacement characteristics in several target speed positions of an internal combustion engine using the mechanical all-speed governor.

As described above, the mechanical all-speed governor suffers changes with time or shows variations from product to product, causing variations to occur in the straight lines a representing the rack displacement characteristic and the output torque characteristic as shown in FIGS. 22 and 23, respectively. Thus, in actual practice, the points of speed deviations $\Delta N_1$, $\Delta N_o$ and $\Delta N_2$ would not accurately coincide with points A, $A_1$ and $A_2$, and to prevent engine shutdown due to fluctuations in load, it would be necessary to set the speed deviation $\Delta N_o$ at which the load is made to begin to decrease and the speed deviation $\Delta N_2$ at which the load is minimized at small values by giving reserve thereto. When this is the case, control would be effected such that the load is minimized before the output torque reaches a maximum value, thereby making it impossible to make use of the engine output to a maximum.

An embodiment of the control method and system in conformity with the invention using a fluid circuit for controlling the displacement volume will now be described by referring to FIGS. 24-32.

Figure 24:
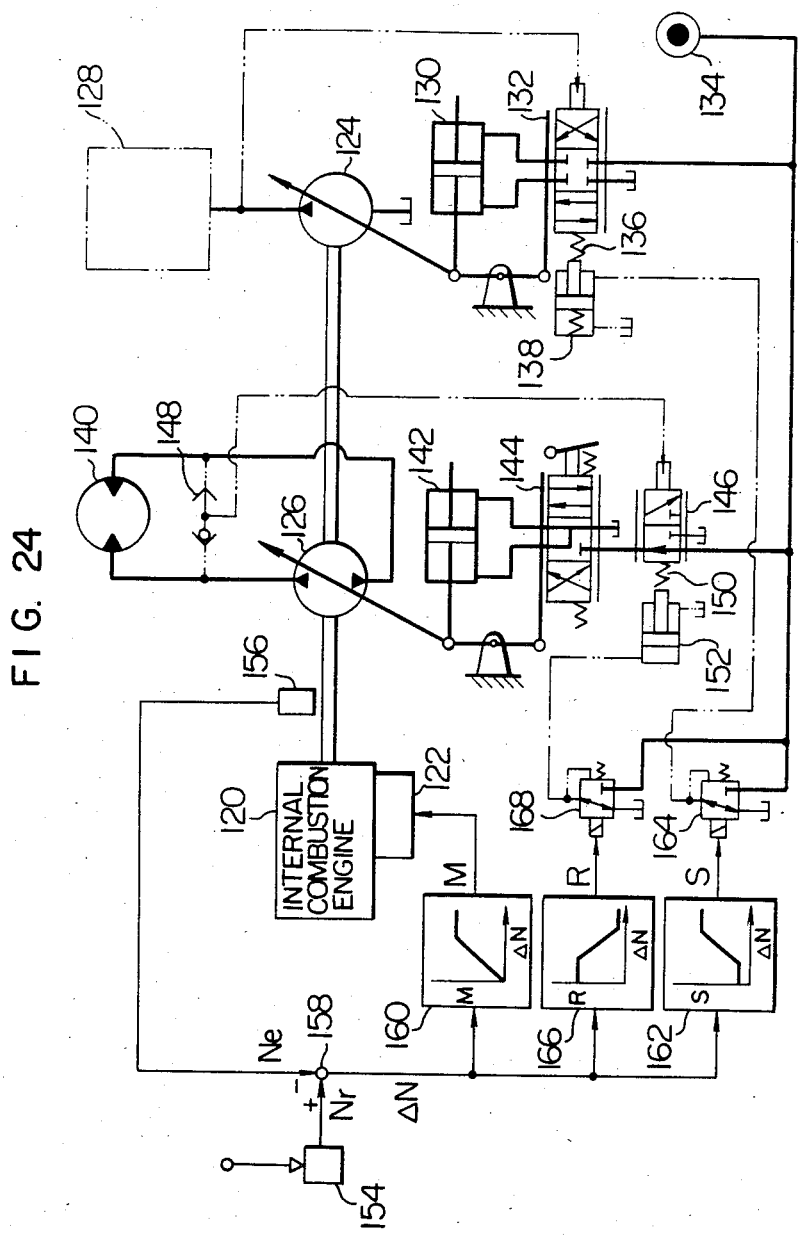
FIG. 24 is a schematic view of the control system comprising a second embodiment.

In FIG. 24, an internal combustion engine 120, such as a diesel engine is controlled by having its fuel injection adjusted, with adjustments of the fuel injection of the internal combustion engine 120 being effected by a fuel injection device 122 including a fuel injection pump. The internal combustion engine 120 has two variable displacement hydraulic pumps 124, 126 connected thereto for driving them.

In the embodiment of FIG. 24, the variable displacement hydraulic pump 124 is a swash plate pump of the fixed direction type and supplies pressure fluid to a load system 128 for driving an actuating section therein. The swash plate tilting angle or displacement volume of the hydraulic pump 124 is adjusted by a cylinder 130 which constitutes a hydraulic servo mechanism together with a servo valve 132. The servo valve 132 actuates the cylinder 130 by receiving a supply of hydraulic fluid from a hydraulic fluid source 134 in response to the discharge pressure of the hydraulic pump 124. The condition of actuation of the servo valve 132 with respect to the discharge pressure of the pump 124 is set by the biasing force of a spring 136 which is adjusted through a piston mechanism 38 by a pilot pressure command subsequently to be described.

The hydraulic servo mechanism composed of the cylinder 130 and servo valve 132 constitutes an input torque restricting mechanism for the hydraulic pump 124. In the input torque restricting mechanisms, hydraulic fluid is fed into a right chamber of the cylinder 130 and held therein while the discharge pressure of the hydraulic pump 124 is lower than the value set by the spring 136 for the servo valve 132, thereby maximizing the swash plate tilting angle of the hydraulic pump 124 to keep the discharge rate thereof at a maximum level. When the load applied to the actuating section in the load system 128 increases, the discharge pressure of the hydraulic pump 124 also increases. When the value set by the spring 136 is exceeded by the discharge pressure, the servo valve 132 is moved leftwardly to feed hydraulic fluid into a left chamber of the cylinder 130. This decreases the swash plate tilting angle of the hydraulic pump 124 and reduces its discharge. Thus, the input torque of the hydraulic pump 124 does not rise above the value obtained when the discharge pressure reaches the value set by the spring 136 and the servo valve 136 begins to operate.

In the present invention, the biasing force of the spring 136 of the servo valve 132 is adjusted by the piston mechanism 138. Thus, it is possible to control a maximum value of the input torque of the hydraulic pump 124, depending on the value of a pilot control pressure introduced into the piston mechanism 138.

Also, in this embodiment, the variable displacement hydraulic pump 126 which is a swash plate pump of the reversible type is connected to a hydraulic motor 140 to form a closed circuit. The swash plate tilting angle or displacement volume of the hydraulic pump 126 is adjusted by cylinder 142 which constitutes a hydraulic servo mechanism together with a servo valve 144 and a control valve 146 subsequently to be described and which is actuated by an input manipulation of the servo valve 144. A supply of hydraulic fluid from the source 134 to the servo valve 144 is controlled by the control valve 146 which is actuated in response to a main circuit pressure of the closed circuit constituted by the pump 126 and the motor 140. The main circuit pressure of the closed circuit is taken out by a shuttle valve 148. The condition of actuation of the control valve 146 with respect to the main circuit pressure of the closed circuit is set by the biasing force of a spring 150 which is adjusted through a piston mechanism 152 by a pilot pressure command subsequently to be described.

The hydraulic servo mechanism composed of the cylinder 142, servo valve 144 and control valve 146 constitutes a constant pressure control mechanism for the main circuit pressure of the closed circuit composed of the hydraulic pump 126 and hydraulic motor 140. In the constant pressure control mechanism, the hydraulic pump 126 has its swash plate tilting angle or displacement volume decided as the cylinder 142 is actuated in response to the manipulated variable of the servo valve 144 by its input manipulation. When the hydraulic motor 140 has a high inertia load at hydraulic pump startup, the discharge pressure of the hydraulic pump 126 will rise and may exceed the value set by the spring 150. When this is the case, the control valve 146 is shifted leftwardly to reduce the supply of pressure fluid to the servo valve 144, thereby decreasing the increasing rate of the swash plate tilting angle or the displacement volume. Thus, the hydraulic pump 126 has its displacement volume increased to a value corresponding to the manipulated variable of the servo valve 144 while having the discharge pressure maintained at a value set by the spring 150. Thus, the main circuit pressure of the closed circuit can be maintained at the value set by the spring 150.

In the invention, the biasing force of the spring 150 of the control valve 146 is adjusted by the piston mechanism 152. Thus, it is possible to adjust the main circuit pressure to be maintained, depending on the value of a pilot control pressure introduced into the piston mechanism 152, and to control the maximum value of the input torque of the hydraulic pump 126.

The target speed of the internal combustion engine 120 is set by the manipulated variable of a throttle lever 154 which generates as a target speed signal $N_r$ a voltage proportional to the manipulated variable of the throttle lever 154. Meanwhile, the output speed of the internal combustion engine 120 which is its actual speed is sensed by a sensor 156 which generates as an output speed signal $N_e$ a voltage proportional to the actual speed. The difference between the target speed signal $N_r$ from the throttle valve 154 and the output speed signal $N_e$ from the sensor 156 is calculated at an adder 158 which generates as a speed deviation signal $\Delta N$ a voltage proportional to the difference.

The speed deviation signal $\Delta N$ is supplied to a function generator 160 which generates as a rack displacement target signal or fuel injection target value M a voltage of a value large enough to satisfy a predetermined functional relation to the speed deviation signal $\Delta N$. The rack displacement target signal M is supplied to the fuel injection device 122 to adjust the fuel injection of the fuel injection pump.

The speed deviation signal $\Delta N$ is also supplied to a function generator 162 which generates as a control pressure command value S a voltage of a value large enough to satisfy a predetermined functional relation to the speed deviation signal $\Delta N$. The control pressure command value S is supplied to an electrohydraulic transducer valve 164 composed of a proportional electromagnetic valve which generates a control pressure of a value proportional to the control pressure command value S and supplies same into a pressure receiving section of the piston mechanism 138 as a pilot pressure command thereby to control the maximum value of the input torque of the hydraulic pump 124 in such a manner that it decreases when the speed deviation signal $\Delta N$ increases.

Figure 25:
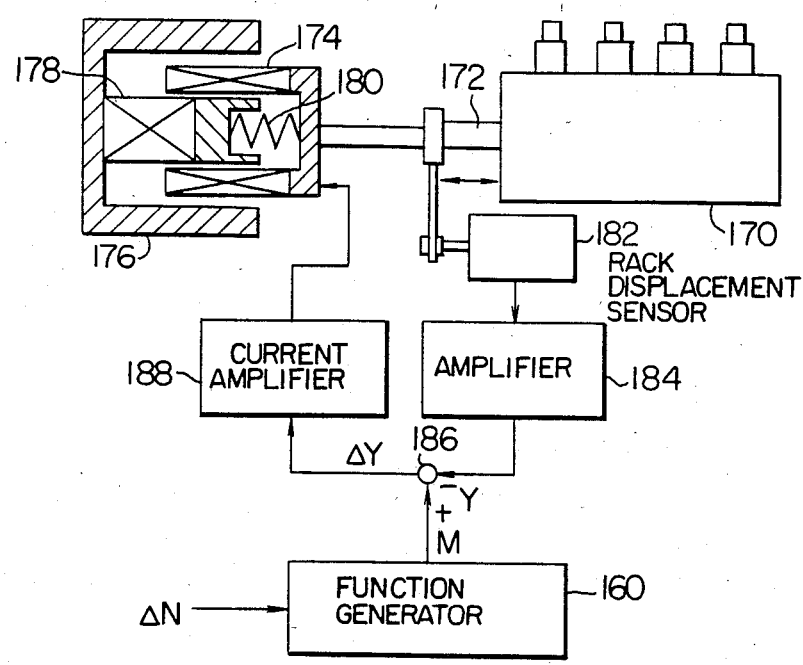
FIG. 25 is a schematic view of the fuel injection device of the control system shown in FIG. 24.

The speed deviation signal $\Delta N$ is further supplied to a function generator 166 which generates, as a control pressure, command value R a voltage of a value large enough to satisfy a predetermined functional relation to the speed deviation signal $\Delta N$. The control pressure command value R is fed into an electrohydraulic transducer valve 168 composed of a proportional electromagnetic valve which generates a control pressure of a value proportional to the control pressure command value R and supplies same to a pressure receiving section of the piston mechanism 152 as a pilot pressure command to thereby control the maximum value of the input torque of the hydraulic pump 126 in such a manner that it decreases when the speed deviation $\Delta N$ increases. As shown in FIG. 25, the fuel injection device 122 comprises a fuel injection pump 170 which has its fuel injection adjusted by a displacement of a rack 172, with the rack 172 being driven by an actuating device including a movable coil 174 a yoke 176, a permanent magnet 178, and a return spring 180. A displacement of the rack 172 is sensed by a rack displacement sensor 182 which generates a sensing signal fed into an adder 186 as a rack displacement signal Y through an amplifier or waveform shaping circuit 184. The adder 186 also receives a supply of the rack displacement target value signal M from the function generator 160 and generates a rack manipulating signal based on the difference $\Delta Y$ between the two signals which is fed to a current amplifier 188 where it is changed to a DC signal or pulse duration modulated signal which is supplied to the movable coil 180 to drive same.

Figure 26:
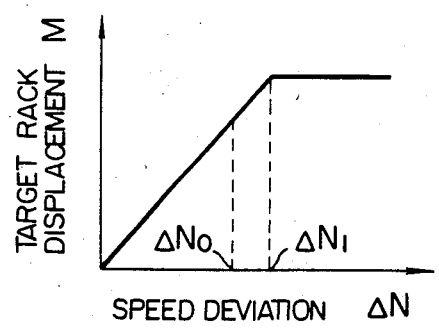
FIG. 26 is a graph showing the function with respect to the rack displacement target value set in the function generator in the control system shown in FIG. 24.

The function generator 160 for generating the rack displacement target value M has a function between the speed deviation $\Delta N$ and the rack displacement target value M set in such a manner that, as shown in FIG. 26, the rack displacement target value or fuel injection target value increases substantially linearly until the speed deviation reaches a predetermined value $\Delta N_1$ and thereafter shows a substantially constant maximum value, in this embodiment.

Figure 27:
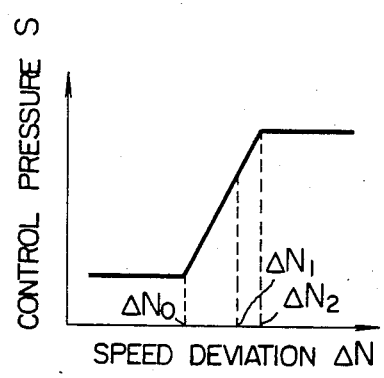
FIGS. 27 and 28 are graphs showing the functions with respect to the control pressure set in the function generator in the control system shown in FIG. 24.

The function generator 162 (FIG. 24) for generating the control pressure command value S has a function between the speed deviation $\Delta N$ and the control pressure command value S set in such a manner that, as shown in FIG. 27, the control pressure shows a substantially constant minimum value until the speed deviation $\Delta N$ reaches a predetermined value $\Delta N_o$, the cotnrol pressure increases substantially linearly until the speed deviation reaches a predetermined value $\Delta N_2$ and thereafter the control signal shows a substantially constant maximum value, in this embodiment.

Figure 28:
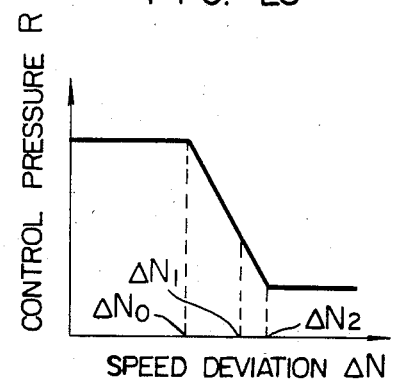

The function generator 166 (FIG. 24) for generating the control pressure command value S has a function between the speed deviation $\Delta N$ and the control pressure command value S set in such a manner that, as shown in FIG. 28, the control pressure shows a substantially constant maximum value until the speed deviation reaches $\Delta N_o$, the control pressure decreases substantially linearly until the control pressure reaches $\Delta N_2$ and thereafter the control pressure shows a substantially constant minimum value, in this embodiment.

As can be seen in FIGS. 27 and 28, the speed deviations $\Delta N_o$, $\Delta N_1$ and $\Delta N_2$ are related such that $\Delta N_o < \Delta N_1 < \Delta N_2$ in this embodiment.

In the embodiment described hereinabove, the throttle lever 154, output speed sensor 156, adder 158, function generator 160 and fuel injection device 122 constitute means for controlling the output torque of the internal combustion engine 120 by comparing the target speed and output speed with each other. In this manner, the function generator 160 directly generates a rack position target value M from the speed deviation signal $\Delta N$ to control output torque by controlling the fuel injection by the rack position target value M. Thus, the speed deviation which is the difference between the target speed and the output speed accurately reflects the characteristic of the internal combustion engine such as output torque.

Figure 29:
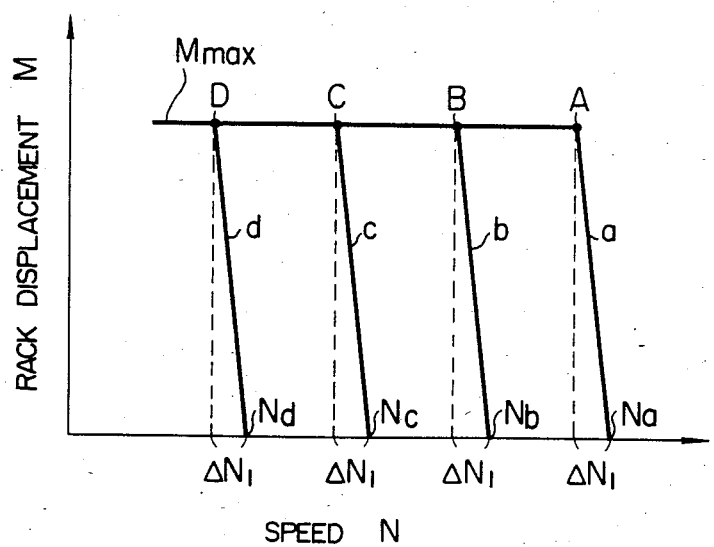
FIG. 29 is a graph similar to that shown in FIG. 22 but showing the rack displacement characteristics in several target speed positions of the control system shown in FIG. 24.

Stated differently, in the invention, the relationship of the rack displacement M to the speed deviation $\Delta N$ is uniquely decided by the function generator 160, so that the relationship is not influenced by the value of the target speed. When this is considered in terms of the rack displacement characteristic at each of the target speed positions Na, Nb, Nc and Nd in the same manner as described by referring to FIG. 22, straight lines a, b, c and d shown in FIG. 29 representing the characteristics are completely parallel to one another. It goes without saying that the speed deviation $\Delta N_1$ that gives a maximum value $M_{max}$ at point A when the target speed is Na also gives a maximum value of rack displacement at points B, C and D when the target speed is changed to Nb, Nc and Nd.

Figure 30:
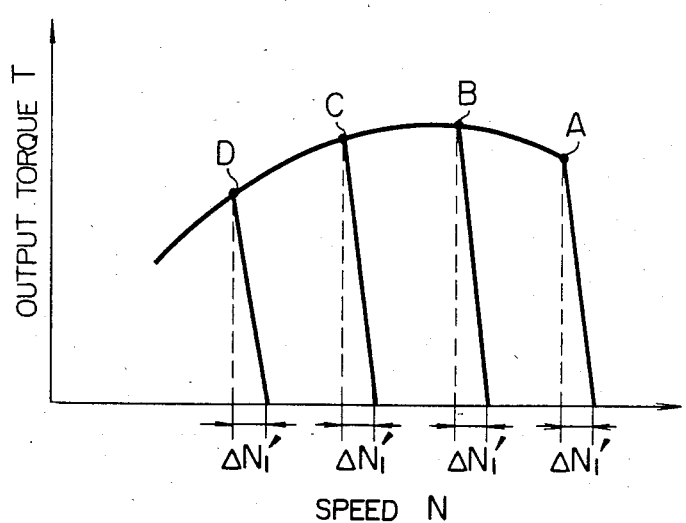
FIG. 30 is a graph similar to that shown in FIG. 23 showing the output torque characteristics.

When the aforesaid point is considered in terms of the output torque characteristic at each of the target speed positions Na, Nb. Nc and Nd in the same manner as described by referring to FIG. 23, the speed deviation $\Delta N_1$, that gives a maximum value of the output torque T at point A on the maximum output torque curve also shows a maximum value of the output torque at each of points B, C and D on the substantially maximum output torque curve when the target speed is changed to Nb, Nc and Nd as shown in FIG. 30. It will be understood that the speed deviation $\Delta N$ used in the invention is a value of high reliability.

In the embodiment described hereinabove, the speed deviation $\Delta N_1$ that maximizes the rack displacement target value M at the function generator 160 corresponds to the $\Delta N_1$ shown in FIG. 29. Because of the reliability of the speed deviation, $\Delta N_o$ and $\Delta N_2$ are set in the vicinity of points A, B, C and D in FIGS. 29 and 30.

Operation of the control device described hereinabove will be explained. Assuming that the manipulated variable of the throttle lever 154 is set at a certain target speed, the difference between the target speed signal $N_r$ and the output speed signal $N_e$ is calculated at the adder 158 and the speed deviation signal $\Delta N$ is supplied to the function generator 160, so that the rack displacement signal M, decided by the function set in the function generator 160, is supplied to the fuel injection device 122 which feeds an amount of fuel injection commensurate with the signal M to the internal combustion engine 120. When the output torque of the internal combustion engine 120 decided by the amount of fuel injection and the total of the input torques of the hydraulic pumps 124 and 126 balance, the internal combustion engine 120 operates while maintaining the output speed constant.

If the load applied to the internal combustion engine 120 increases as the load applied to an actuating section in the load system 128 increases, for example, the output speed $N_e$ of the internal combustion engine 120 decreases and the speed deviation $\Delta N$ increases, so that rack displacement target value M increases at the function generator 160 in accordance with the function set therein, thereby increasing fuel injection and output torque.

However, if the load further increases and an overload condition is created, then the output torque tends to decrease by exceeding point A, for example, in FIG. 30.

Figure 31:
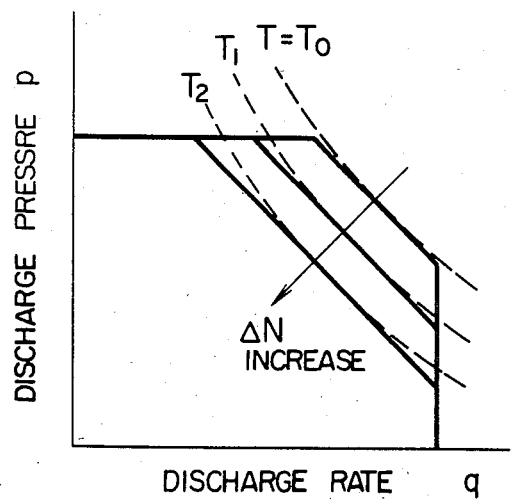
FIGS. 31 and 32 are graphs showing maximum values of the input torque of the hydraulic pump controlled by the control system shown in FIG. 24.

In this case, the speed deviation $\Delta N$ increases and reaches $\Delta N_o$. Thus, the control pressure command value S produced by the function generator 162 which receives the speed deviation $\Delta N_o$ becomes larger in accordance with the function set therein and fed into the electro-hydraulic transducer valve 164. A control pressure commensurate with the command value S is supplied to the pressure receiving section of the piston mechanism 138 to reduce the biasing force of the spring 136. Thus, the maximum value of the input torque of the hydraulic pump 124 is reduced as described hereinabove. FIG. 31 shows that as the speed deviation $\Delta N$ increases by exceeding $\Delta N_o$, the input torque T of the hydraulic pump 124 decreases as indicated at $T_o$, $T_1$ and $T_2$. This reduces the load applied to the internal combustion engine 120 and prevents overloading.

Figure 32:
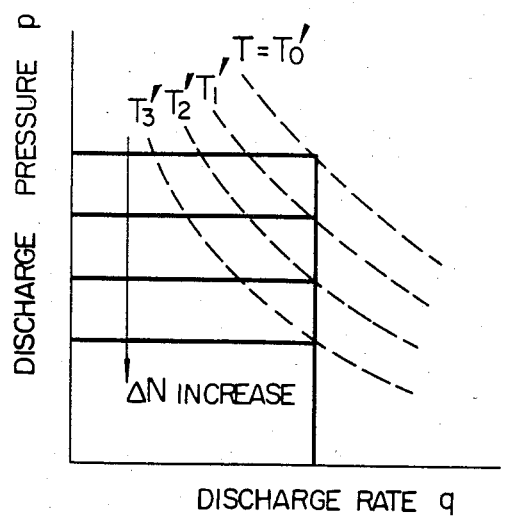

The speed deviation signal $\Delta N$ is also fed into the function generator 166. Thus, the control pressure command value R becoming smaller in accordance with the function set therein is fed into the electrohydraulic transducer valve 168 which supplies a control pressure commensurate therewith to the pressure receiving section of the piston mechanism 152. This reduces the biasing force of the spring 150 of the control valve 146 thereby to reduce the set pressure of the main circuit pressure as aforesaid. Thus, the maximum value of the input torque of the hydraulic pump 126 is reduced. FIG. 32 shows that as the speed deviation $\Delta N$ increases by exceeding $\Delta N_o$, the main circuit pressure decreases and the input torque T of the hydraulic pump 26 decreases as indicated at $T_{o'}$, $T_{1'}$, $T_{2'}$ and $T_{3'}$. This reduces the load applied to the internal combustion engine 120 and prevents overloading.

When the invention has application in a system having more than one variable displacement hydraulic pumps as in the aforesaid embodiment, the output torque of the internal combustion engine can be distributed in accordance with the load applied to each pump thereby to enable the output to be utilized with increase effectiveness.

In the embodiment described hereinabove, the function set in each of the function generators 160, 162 and 166 is merely one example of many functions available and various modifications may be made thereto in accordance with the desired output characteristic and the constructions of piston mechanisms 138 and 152.

For example, when an external force acts on the motor 140, trouble would occur in that the motor 140 might begin to be rotated by the external force, in the event that no command signal is supplied to the electro-hydraulic transducer valve 168 due to a failure of the control system while the internal combustion engine 120 is operating since the set pressure of the control valve 146 would drop in this embodiment. In this case, one has only to use the construction of the piston mechanism 138 for the piston mechanism 152 and set the function of the function generator 166 similar to the function generator 162. When it is desired to minimize the input torque of the hydraulic pump 124 in the event that similar failure occurs, one has only to use the construction of the piston mechanism 152 for the piston mechanism 138 and set the function of the function generator 162 similar to the function generator 166.

The number of the variable displacement hydraulic pumps for driving the internal combustion engine is not limited to two, and, for example, only one pump may be provided. Also, the type of the hydraulic circuit with which the hydraulic pumps are associated is not limited to the one described hereinabove, and the invention may be applied to a hydraulic circuit of the type having conventional direction control valves of the lever operated type. The control pressure for controlling the piston mechanisms may be air pressure.

From the foregoing description, it will be appreciated that in the control method and system according to the invention, control of fuel injection of an internal combustion engine is effected based on an engine speed deviation by obtaining of fuel injection target value which is in predetermined functional relationship to the speed deviation, and therefore the speed deviation can accurately reflect the operating condition of the internal combustion engine, and also, control of the input torque of the hydraulic pump is effected by using the same engine speed deviation as used in controlling the fuel injection of the internal combustion engine, and therefore adjustments of the control system can be readily made and engine output can be utilized to a maximum in all the speed ranges. It will also be appreciated that control of the displacement volume of the hydraulic pump is effected based not only on an engine speed deviation but also on an actual discharge pressure of the hydraulic pump, and therefor a marked increase in the stability of the control system as a whole is obtained since the effect of feedback compensation can be achieved that has not been achieved by a series compensation that has been practiced.

Generally, in a hydraulic shovel, a plurality of variable displacement hydraulic pumps are connected with an internal combustion engine, and constitute hydraulic circuits in such a manner that actuators such as, for example, a left travel motor and a right travel motor, or an arm cylinder and a bucket cylinder can be respectively simultaneously driven by separate variable displacement pumps. In this type of hydraulic circuits, it is desired that when the actuators, having the substantially same capacities such as left and right travel motors, are actuated, the output torque of the internal combustion engine be evenly distributed, while when the actuators having greatly different capacities such as arm cylinder and bucket cylinder are actuated, the output torque of the internal combustion engine be distributed such that a greater share is supplied to the arm cylinder than to the bucket cylinder, thereby improving operation performance of the circuits.

Figure 33:
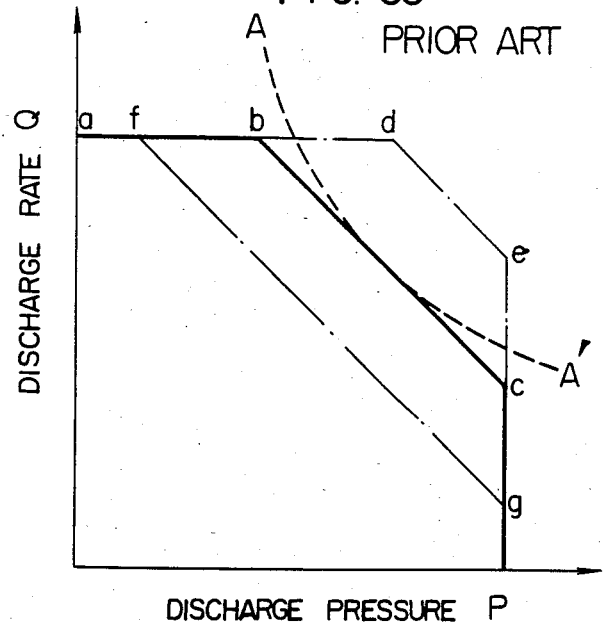
FIG. 33 is a graph showing the relationship between the pump input and the output torque of the internal combustion engine for the hydraulic pumps in a control method of the prior art.

Control systems for effecting such distribution of the output torque of an internal combustion engine are disclosed in, for example, in Japanese Patent Application Laid-Open No. 162801/79 and Japanese Patent Application Laid-Open No. 23417/80. In these control systems, the output torque of the internal combustion engine is distributed as follows. When the left and right travel motors are actuated, the output torque of the internal combustion engine is distributed in a manner to render the input torque characteristics of the variable displacement hydraulic pumps for driving the motors equal to each other as indicated by a-b-c in FIG. 33 (P is the discharge pressure; Q is the discharge rate and A-A' is the distribution of the internal combustion engine output torque), and when the arm cylinder and the bucket cylinder are driven, the output torque of the internal combustion engine is distributed in a manner to render the input torque characteristics of the variable displacement pumps for driving the cylinders different from each other as indicated by a-d-e and a-f-g. The total of the input torques of the hydraulic pumps should not exceed the output torque of the internal combustion engine.

In the control systems described hereinabove, when each actuator is separately driven, it would be impossible to obtain an input torque characteristic a-d-e enabling the engine output torque to be effectively used because the input torque characteristic of each pump becomes a-b-c. Also difficulties would be encountered at all times in bringing the total of the input torques of the plurality of pumps close to the output torque of the engine because of the difference in efficiency between the input torque characteristics a-d-e and a-f-g of the pumps and variations in the difference in efficiency.

The third embodiment presently to be described has been developed to obviate the aforesaid problem, in addition to the problems obviated by the first and second embodiments described hereinabove. The third embodiment contemplates that the input torque characteristics of a plurality of variable displacement hydraulic pumps can be set as desired in accordance with the types of the actuators to be driven, the total of the input torques of the plurality of pumps can be controlled not to exceed the output torque of the engine at all times, and when each actuator is independently driven, the input torque of each pump can be controlled in such a manner that the output torque of the engine can be effectively utilized.

Figure 34:
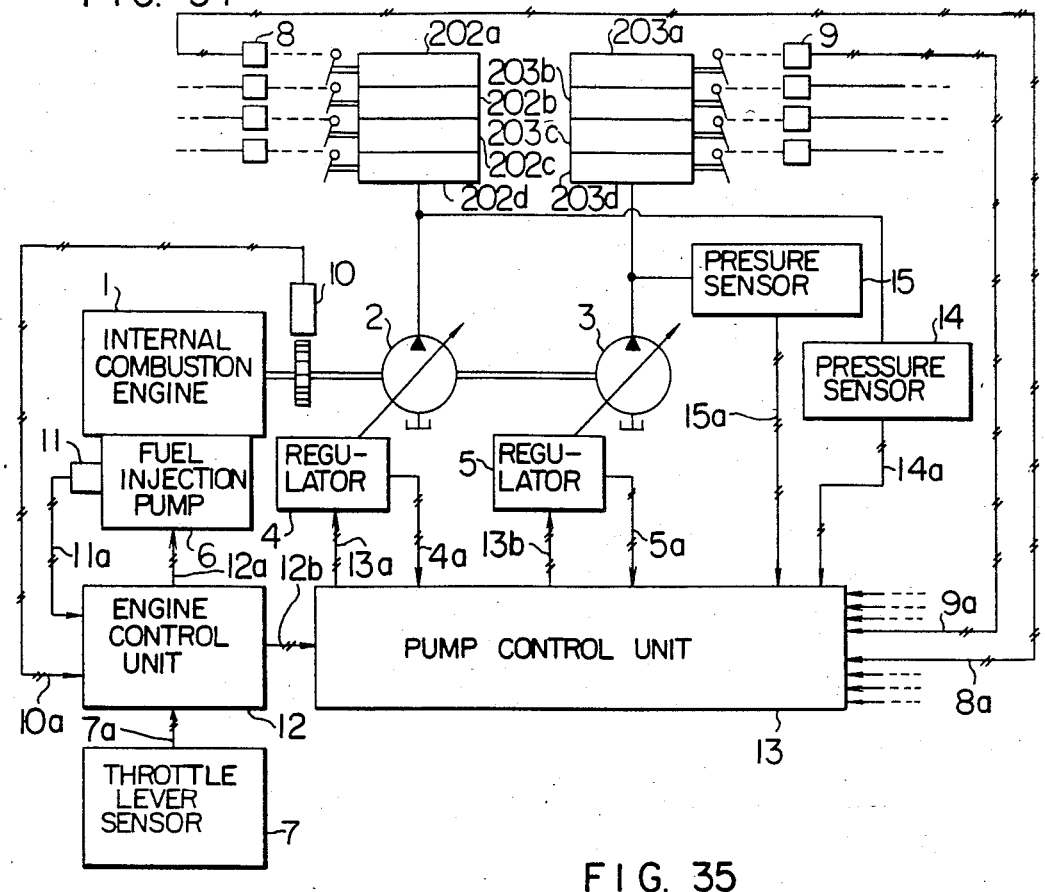
FIG. 34 is a schematic view of control system comprising a third embodiment for a hydraulic power system of the present invention.

As shown in FIG. 34, the hydraulic pump 2 is associated with four actuators, not shown, which are driven by operating means 202a, 202b, 202c and 202d. The hydraulic pump 3 is associated with four actuators also which are driven by operating means 203a, 203b, 203c and 203d. The operating means 202a and 203a have respectively linked thereto manipulated variable sensors 8 and 9, which feed externally manipulated variable signals 8a and 9a to the pump control unit 13. Other operating means 202b, 202c, 203d, 203b, 203c and 203d have respective manipulated variable sensors which feed respective externally manipulated variable signals to the pump control unit 13.

The control process for the control unit 12 for the internal combustion engine 12 is the same as that of the first embodiment described in connection with FIGS. 4-10.

The control process for the control unit 13 for the hydraulic pumps 2 and 3 is the same as that of the first embodiment described in connection with FIGS. 11-20, except for the following.

In step 55 described by referring to FIG. 11, control of the hydraulic pump 3 is effected in the same manner as control of the hydraulic pump 2, but distribution of absorption horsepowers of the pumps 2 and 3 is taken into consideration in the control. More specifically, when the operating means 202a and 203a linked to the sensors 8, 9 as shown in FIG. 34 give commands for driving actuators (such as the arm cylinder and bucket cylinder) that may prefer to have the different distribution of absorption horsepower between the two hydraulic pumps, a target value $X_H$, of the swash plate tilting distinct from the $X_H$ decided in step 51 is decided in step 55 based on functions $g_1'$ ($\Delta N$) and $g_2'$ ($\Delta N$) distinct from the functions $g_1$ ($\Delta N$) and $g_2$ ($\Delta N$) shown in FIGS. 16 and 17, respectively, and by the same process as in step 51.

Figure 35:
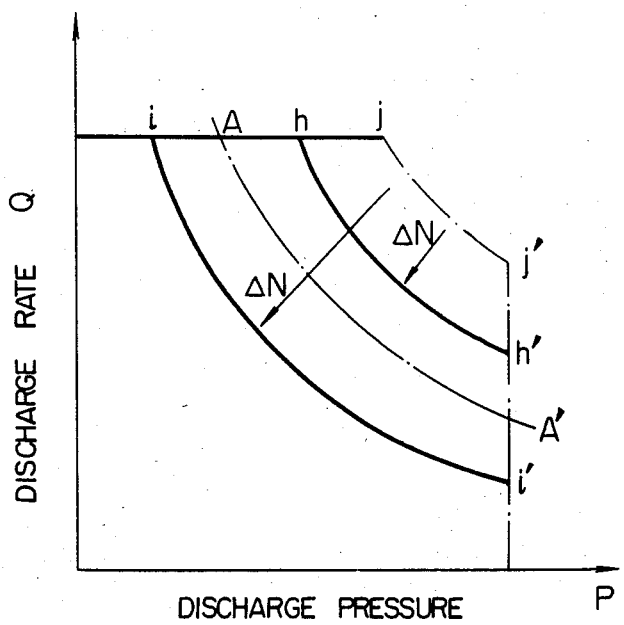
FIG. 35 is a graph showing the relationship between the input torque of the hydraulic pump and the speed deviation of the internal combustion engine in the embodiment of FIG. 34.

By this arrangement, it is possible to set different input torque characteristics for the hydraulic pumps 2 and 3 with respect to the same speed deviation $\Delta N$, as indicated by h-h' and i-i' in FIG. 35. Thus, it is possible to vary, as desired, the distribution of the output of the internal combustion engine 1 to the actuator driven by the hydraulic pump 2 and the actuator driven by the hydraulic pump 3.

It goes without saying that when one of the hydraulic pumps 2 and 3 is used or even when both of them are simultaneously used with one having a extremely small load, it is possible to obtain a maximum input torque characteristic as indicated by j-j' in FIG. 35 within a range restricted by the capacities of the pumps 2 and 3 or the output of the internal combustion engine 1.

In the foregoing description, the hydraulic pumps 2, 3 are what are generally referred to as hydraulic pumps of the single tilting type in which the swash plate tilting only has a positive value. It is to be understood that the same concept applies to a drive system of the closed hydraulic circuit using hydraulic pumps of the dual tilting type in which the swash plate tilting has both positive and negative values.

In the embodiment described hereinabove, in order to enable the contents of the invention to be readily understood, the control unit 12 for the internal combustion engine 1 and the control unit 13 for the pumps 2, 3 have been described as being separate hardware. However, they may be constructed as a single unit by using a microcomputer.

In order to enable the description to be readily understood, since the control system of the invention requires logical control, the control system has been described by referring to embodiments in which a microcomputer is used. However, the control system of the invention can be carried into practice.

Figure 36:
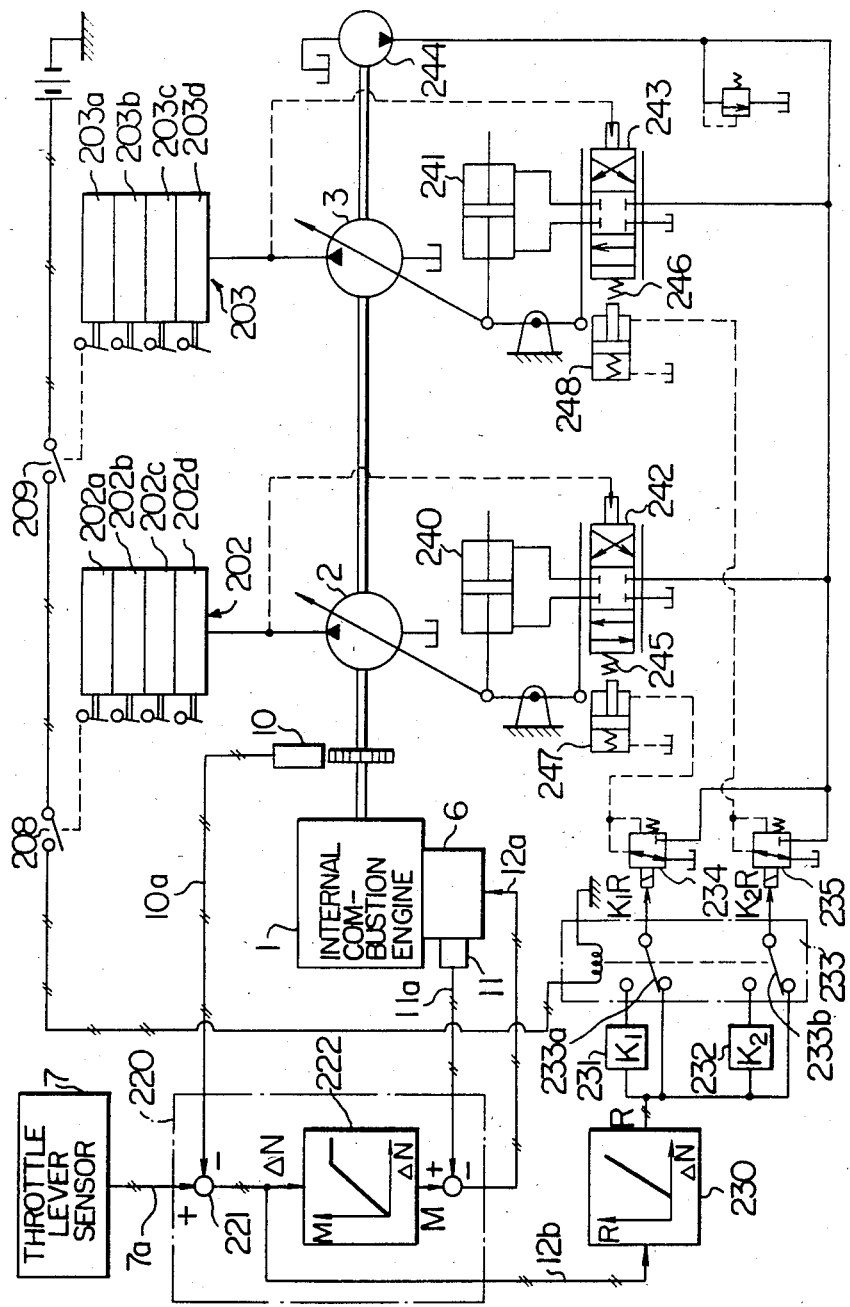
FIG. 36 is a schematic view of a modification to the third embodiment shown in FIG. 34.

As shown in FIG. 36, the internal combustion engine 1 has two variable displacement hydraulic pumps 2, 3 connected thereto which are swash plate pumps of the fixed direction type. The pumps 2, 3 have their swash plate tilting angles or displacement volumes respectively adjusted by cylinders 240, 241, which respectively constitute hydraulic servo mechanisms together with servo valves 242, 243. The servo valves 242, 243 actuate the cylinders 240, 241 by receiving a supply of hydraulic fluid from a hydraulic fluid source 244 in accordance with the discharge pressures of the hydraulic pumps 2, 3. The conditions of operation of the servo valves 242, 243 with respect to the discharge pressures of the pumps 2, 3 are set by the biasing forces of springs 245, 246, respectively. The biasing forces of the springs 245, 246 are adjusted through piston mechanisms 247, 248 by pilot pressure command subsequently to be described. The hydraulic servo mechanisms composed of the cylinders 240, 241 and servo valves 242, 243 constitute input torque restricting mechanisms for the pumps 2, 3, respectively. In the input torque restricting mechanisms, hydraulic fluid is supplied to right chambers of the cylinders 240, 241 and held therein by the feedback effected by linkages when the discharge pressures of the pumps 2, 3 are lower than the values set by the springs 245, 246, respectively, thereby maximizing the swash plate tilting angles of the pumps 2, 3 to keep the discharge rates thereof at maximum values. As the load increases and the discharge pressures of the pumps 2, 3 increase, the servo valves 242, 243 move leftwardly when the values set by the springs 245, 246 are exceeded by the discharge pressures, so that hydraulic fluid is supplied to left chambers of the cylinders 240, 241. This reduces the swash plate tilting angles of the pumps 2, 3 and the discharge rates thereof. Thus, the input torques of the pumps 2, 3 do not increase above the values obtained when the servo valves 242, 243 begin to operate after the values set by the springs 245, 246 are reached by the discharge pressures. In this embodiment, the biasing forces of the springs 245, 246 of the servo valves 242, 243 are adjusted by the piston mechanisms 247, 248, respectively. By this arrangement, it is possible to control maximum values of the input torques of the pumps 2, 3 in accordance with the values of the pilot control pressures introduced into the piston mechanisms 247, 248.

A control unit 220 which has the same function as the control unit 12 shown in FIG. 34 feeds a rack operating signal 12a to the fuel injection pump 6 and an engine speed deviation signal 12b ($\Delta N$) to a function generator 230 based on a throttle lever manipulated variable signal 7a from the sensor 7, an output speed signal 10a from the sensor 10 and a rack displacement signal 11a from the sensor 11. In the control unit 220, the difference between the target speed signal Nr from the sensor 7 and the output speed Ne from the sensor 10 are calculated by an adder 221 which produces as an engine speed deviation signal $\Delta N$ a voltage proportional to the difference, and the signal $\Delta N$ is fed into a function generator 222 which, in turn, produces as a rack displacement target value signal or fuel injection target value signal M a voltage of a value large enough to satisfy a predetermined functional relationship with the speed deviation signal $\Delta N$.

The function generator 230 provides, as a control pressure command value R, a voltage of a value large enough to satisfy a predetermined functional relationship to the speed deviation signal $\Delta N$. The control pressure command value R is fed through switches 233a, 233b (in the positions shown in the FIG. 36) of a relay 233 to electro-hydraulic transducer valves 234, 235 respectively, which generate control pressures of a value proportional to the value of the control pressure command value R and feed same into pressure receiving sections of the piston mechanisms 247, 248 as pilot pressure commands, thereby effecting control in such a manner that when the speed deviation $\Delta N$ increases, the maximum value of the total of the input torques of the pumps 2, 3 is reduced.

Also, when operating means 202a, 203a among the operating means 202, 203 of which the associated actuators each prefer to be driven with nonequal distribution of the output torque of the internal combustion engine, switches 208, 209 are closed to bring the relay 233 into connection with a power source to energize same, thereby actuating the switches 233a, 233b. As a result, the control pressure command value R from the function generator 230 is converted into corrected control pressure command values $K_1R$ and $K_2R$ at proportional multiplier setters 231, 232, and the corrected values are supplied through the switches 233a, 233b of the relay 233 to the electrohydraulic transducer valves 234, 235.

Assume that the proportional multipliers $K_1$ and $K_2$ are set as $K_1 > K_2$. Then, the control pressure fed into the piston mechanism 247 with respect to the speed deviation $\Delta N$ is higher in value than the control pressure fed into the piston mechanism 248, so that the maximum value of the input torque of the pump 2 becomes smaller than the maximum value of the input torque of the pump 3. Thus, by setting the proportional multipliers $K_1$, $K_2$ at required values, it is possible to set at required values the input torques of the pumps 2, 3 or the drive torques of the actuators driven by the pumps 2, 3, respectively. In this way, characteristics similar to the hydraulic pump input torque characteristics shown in FIG. 35 can be obtained.

In the third embodiment shown and described hereinabove, two variable displacement hydraulic pumps are used. It is to be understood, however, that the invention is not limited to this specific number of the variable displacement hydraulic pumps and that the invention can have application in a hydraulic power system having more than two pumps.

Thus, in the third embodiment of the invention, adjustments of the control system are facilitated, effective utilization of engine output is made possible in all the speed ranges and the stability of control performance can be increased. In addition, when the hydraulic power system includes a plurality of variable displacement hydraulic pumps driven by an internal combustion engine, the input torque characteristics of a plurality of variable displacement hydraulic pumps can be arbitrarily set in accordance with the types of actuators that are driven, the total of the input torques of the plurality of hydraulic pumps can be controlled not to exceed the output torque of the internal combustion engine at all times, and when any of the actuators is driven singly, the input torques of the hydraulic pumps can be controlled in such a manner that the output torque of the internal combustion engine is effectively utilized.

A fourth embodiment of the control method and system according to the invention will be described by referring to FIGS. 37–39.

In the control method described in above described SAE Paper 760687, there is another problem besides the problems discussed hereinabove. More specifically, when the control method is applied to a drive system comprising a plurality of hydraulic pumps connected to a single internal combustion engine, the pressure of a circuit connecting a hydraulic pump to a hydraulic actuator shows marked fluctuations and sometimes become unstable when a load acting on the hydraulic pump is an inertia load, thereby causing a deterioration of control performance.

Figure 37:
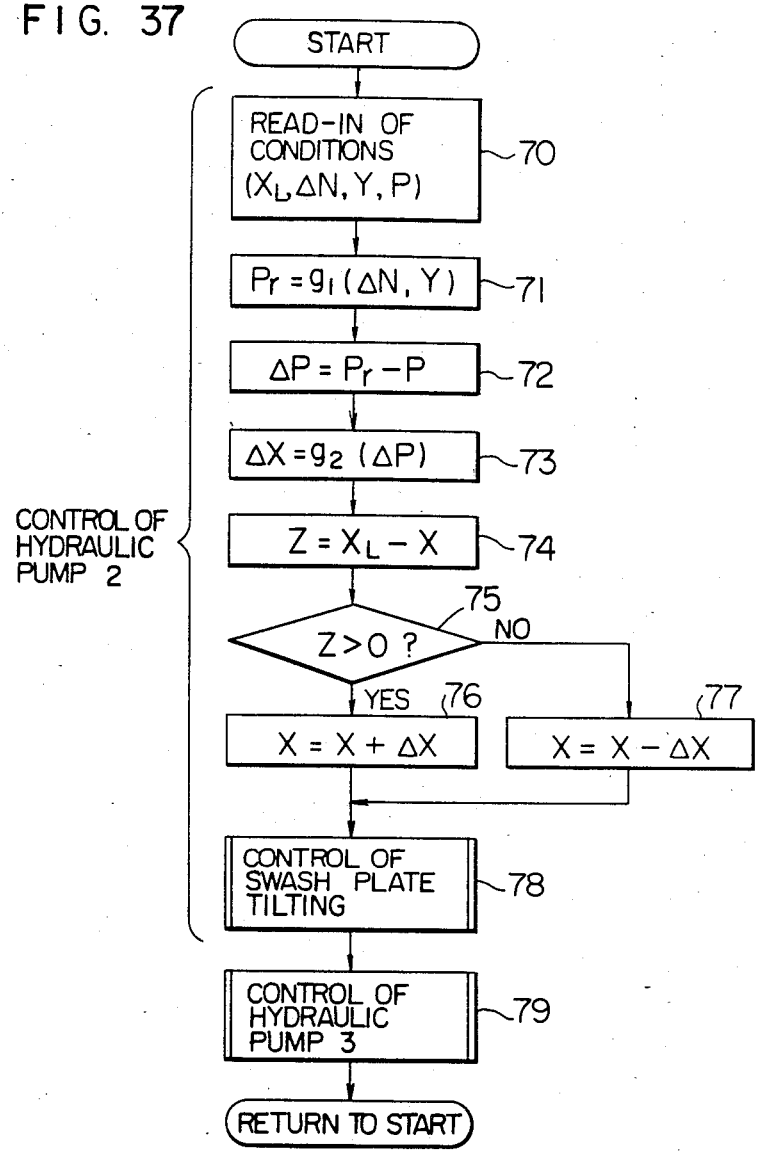
FIG. 37 is a flow chart illustrating calculations effected in the pump control unit of a fourth embodiment of the invention.
Figure 38:
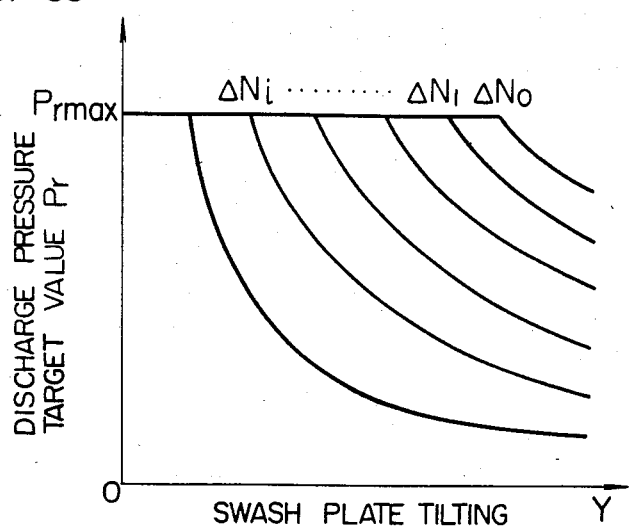
FIG. 38 is a graph showing a swash plate tilting control function for the hydraulic pump in the control method of FIG. 37.
Figure 39:
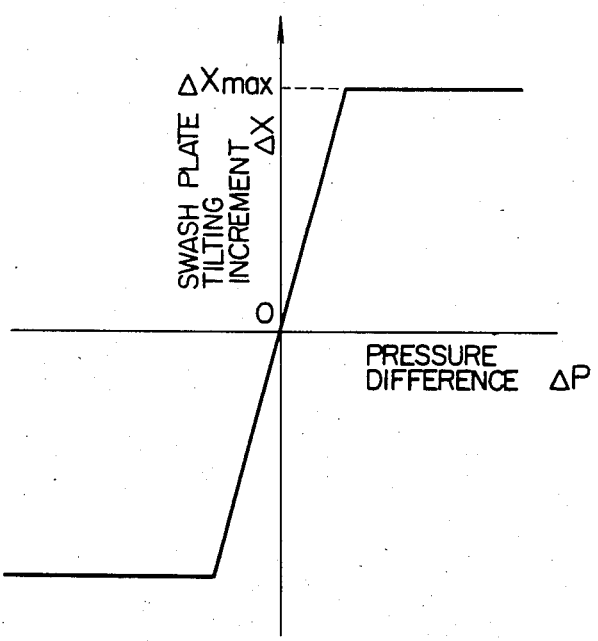
FIG. 39 is a graph showing an input troque control function for the hydraulic pump in the control method of FIG. 37.

The fourth embodiment shown in FIGS. 37–39 has been developed to avoid not only the problems avoided by the first and second embodiments but also to solve the aforesaid problem. In the embodiment of FIGS. 37–39, the control method and apparatus exhibits good control performance even if the load acting on a hydraulic pump is an inertia load.

The fourth embodiment is distinct from the first embodiment described by referring to FIGS. 1–20 in the control method for the control unit 13 for the pumps 2 and 3 shown in FIG. 1, and the descriptions of the first embodiment except for FIG. 11–19 are also applicable to the fourth embodiment.

FIG. 37 shows a control method for the control unit 13 for the hydraulic pumps 2 and 3 according to the fourth embodiment in which a microcomputer is used.

In step 70, conditions of the hydraulic pump 2 including an externally manipulated variable $X_L$ (corresponding to the signal 8a of FIG. 1), a swash plate tilting Y (corresponding to the signal 4a of FIG. 1) and a discharge pressure P (corresponding to the signal 14a of FIG. 1) and a speed deviation $\Delta N$ (corresponding to the signal 12b of FIG. 1) of the internal combustion engine 1 are read in and stored.

Then in step 71, a target value $P_r$ of the discharge pressure is decided based on the preset input torque control function $g_1$ ($\Delta N$, Y) by the speed deviation $\Delta N$ and swash plate tilting Y stored in the previous step 70. In place of the swash plate tilting Y, a target value X of the swash plate tilting of the pump 2 which is provided in the previous cycle may be used. FIG. 38 shows the input torque control function $g_1$ ($\Delta N$, Y).

The input torque of the hydraulic pump 2 is proportional to the product of the swash plate tilting Y and discharge pressure P of the pump. Thus, it is necessary to control the discharge pressure P in such a manner that the product of the swash plate tilting Y and discharge pressure P decreases as the output speed of the engine 1 drops or the speed deviation $\Delta N$ increases. It is the input torque control function $g_1$ that is used for this purpose. The input control function $g_1$ will be described by referring to FIG. 38 in which the abscissa represents the swash plate tilting Y and the ordinate indicates the target value $P_r$ of the discharge pressure. The input torque control function $g_1$ ($\Delta N$, Y) is a hyperbola group or a quasi-hyperbola group which satisfies, when the speed deviation $\Delta N$ is $\Delta N > \Delta N_o$ with respect to a preset value $\Delta N_o$, the following relationship:

$$P_r Y \approx T_{max} - K_N(\Delta N - \Delta N_o) \tag{1}$$

where $T_{max}$ is the maximum input torque of the hydraulic pump and $K_N$ is a constant. Thus, it is possible to decide the optimum target value $P_r$ of discharge pressure from the input torque control function $g_1$ ($\Delta N$, Y) by using the swash plate tilting Y of the pump and the speed deviation $\Delta N$ of the engine 1.

Then in step 72, the difference between the target value $P_r$ of the discharge pressure decided in step 71 and an actual discharge pressure P is obtained and denoted by $\Delta P$.

In step 73, an increment $\Delta X$ of the swash plate tilting of the pump 2 is decided from a function $g_2$ ($\Delta P$) that is stored based on the value of $\Delta P$ obtained in step 72, as shown in FIG. 39. The function $g_2$ is a combination of $\Delta X = K_p \cdot \Delta P$ ($K_p$ is a constant) with a saturation characteristic. The invention has no particular relation to the saturation characteristic.

Then in step 74, the difference Z between the externally manipulated variable $X_L$ of the pump 2 and the swash plate tilting target value X provided in the previous control cycle is obtained. When the difference Z is positive, a new target value X is provided in step 76 by adding the increment $\Delta X$ obtained in step 73 to the target value X provided in the previous control cycle. When the difference Z is negative, a new target value X is provided by deducting the increment $\Delta X$ from the target value X provided in the previous control cycle. The aforesaid process is necessary to cause the swash plate tilting Y of the pump 2 to follow up the externally manipulated variable $X_L$.

In step 78, control is effected to cause the swash plate tilting Y to follow up the target value X obtained by the aforesaid process. The control is effected by the same routine as shown in FIG. 20 and the description thereof is omitted. The description refers to the pump 2, and the pump 3 is controlled by the same routine, so that the description thereof is omitted.

In the foregoing description, control of the hydraulic pump 2 has been described as being effected in steps 70–78 shown in FIG. 37. In step 79, the same process is followed for the hydraulic pump 3. When this is finished, the process returns to the start to repeat the same cycle of control. The process is repeated at a rate of one for each cycle time $\Delta T$, so that a swash plate tilting speed dx/dt has the relationship:

$$dx/dt = \Delta X/\Delta T.$$

When this control method is used, the swash plate tilting speed of the hydraulic pump is proportional to the deviation $\Delta P$ of the discharge pressure. Thus, no sudden fluctuation is produced in the discharge pressure when the load applied to the drive system is a pure inertia load and improved stability is obtained for control performance.

In the foregoing description, what is generally referred to as a single tilting type swash plate pump has been described in which the swash plate tilting Y only has a positive value. However, the same concept can have application in the drive system of a closed hydraulic circuit using a pump of what is generally referred to as a dual tilting type in which the swash plate tilting Y has both positive and negative values.

Figure 40:
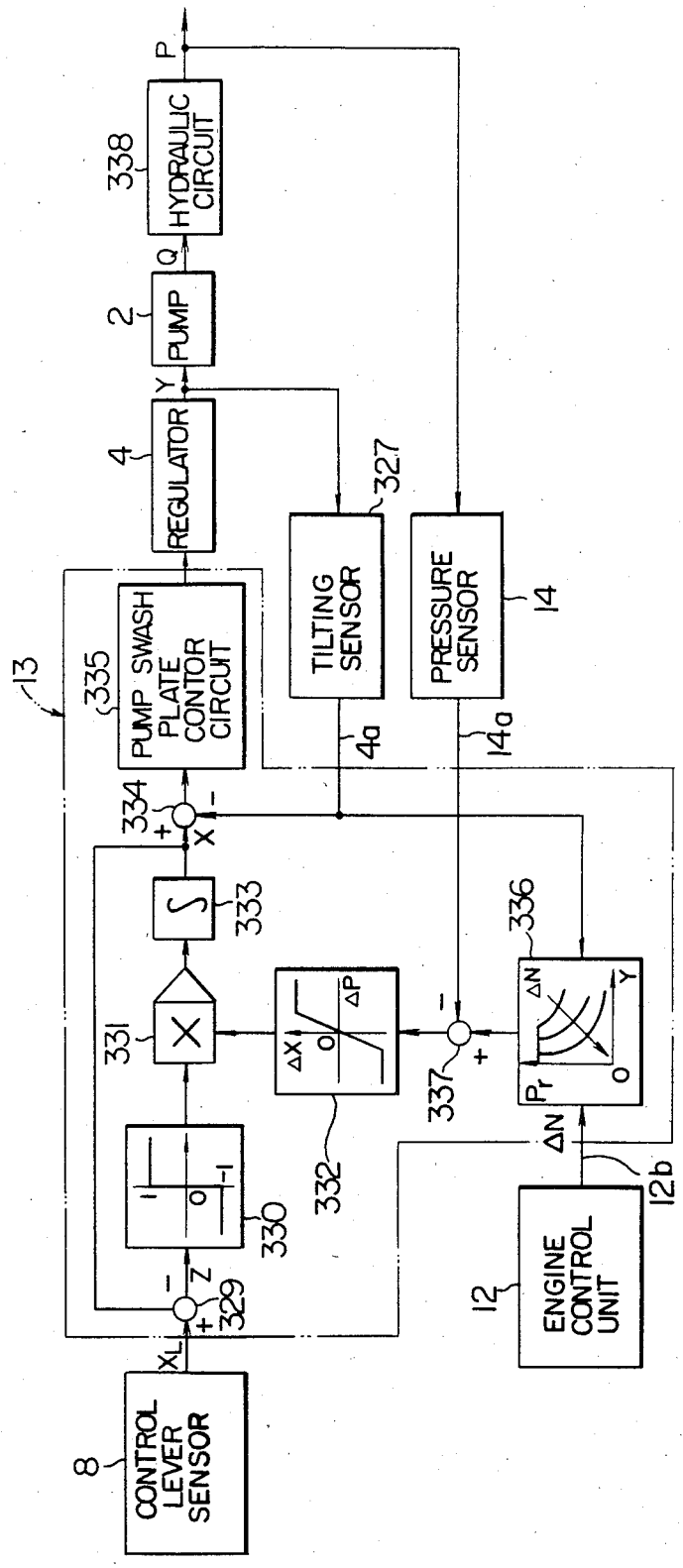
FIG. 40 is a schematic view of a modification to the pump control method comprising the fourth embodiment in accordance with the present invention.

In the fourth embodiment described hereinabove, the pump control unit 13 is a microcomputer, but the pump control unit 13 can be effected by using analog circuits. One example of this mode will be described by referring to FIG. 40 wherein an adder 329 is provided by which the difference Z between an externally manipulated variable $X_L$ (corresponding to the signal 8a) of the pump 2 and a target value X of the swash plate tilting of the pump 2 is obtained. A comparator provides +1 when the difference Z determined by the adder 329 is positive and provides −1 when it is negative. A multiplier multiplies the value of an output $\Delta X$ of a function generator 332 and that of an output (+1 or −1) of the comparator 330 and feeds its output to an integrator 333. The function generator 332 stores a swash plate tilting speed control function $\Delta X = g_2$ ($\Delta P$) of the hydraulic pump shown in FIG. 39. The integrator 333 provides an output or a swash plate tilting target value X of the pump 2 which is fed into an adder 334 and returned to the adder 329. The adder 334 provides the difference between the swash plate tilting target value X and the swash plate tilting Y and provides the difference to a pump swash plate control circuit 335. The swash plate tilting Y of the pump 2, sensed by a sensor 327, is supplied to a function generator 336 which stores an input torque control function $P_r = g_1$ ($\Delta N$, Y) shown in FIG. 38.

The function generator 336 provides to an adder 337 a target value $P_r$ of the discharge pressure obtained from the speed deviation $\Delta N$ of the engine 1 and the swash plate tilting Y of the pump 2. The adder 337 compares a circuit pressure of a hydraulic circuit 338 or a discharge pressure P of the pump 2 sensed by the sensor 14 with the target value $P_r$ of the discharge pressure and determines the difference $\Delta P$ which is provided to the function generator 332. Thus, the function generator 332 carries out a calculation to obtain an increment $\Delta X$ of the swash plate tilting of the hydraulic pump. The increment $\Delta X$ is multiplied by a swash plate tilting command value X of the pump 2 at the multiplier 331 in the same manner as described by referring to FIG. 37. Usually a maximum value of the target value of the discharge pressure is restricted by the rated pressure of hydraulic equipment, so that it is shown as a $P_{rmax}$ in FIG. 38. By using such function, it is possible to effect pressure cutoff control as well as input torque restriction control of the hydraulic pump, so that a relief loss of the hydraulic circuit can be avoided and the end of energy conservation can be attained.

From the foregoing description, it will be appreciated that in the fourth embodiment of the invention adjustments of the control system are facilitated, engine output can be effectively utilized in all speed ranges, and the stability of control performance can be increased, and moreover stable and good control performance can be obtained even if the load of the hydraulic pump is an inertia load, such as an upper swing of a hydraulic shovel.

We claim:

1. A method of controlling a hydraulic power system comprising an internal combustion engine receiving a supply of fuel from a fuel injection pump, and at least one variable displacement hydraulic pump driven by the internal combustion engine, the method comprising the steps of:
   (a) obtaining an engine speed deviation from the difference between a target speed set by an accelerator operation of the internal combustion engine and an output speed of the engine;
   (b) obtaining a fuel injection target value based on at least said engine speed deviation, said fuel injection target value being in predetermined functional relationship to said deviation;
   (c) controlling a fuel injection rate of said fuel injection pump based on said fuel injection target value;
   (d) determining, at the same time, a displacement volume target value of said hydraulic pump based on at least said engine speed deviation and an actual discharge pressure of the hydraulic pump in such a manner that an input torque of said hydraulic pump decreases as the engine speed deviation increases;
   (e) controlling the displacement volume of the hydraulic pump based on the displacement volume target value; and
   wherein in step (b), said fuel injection target value is in a functional relationship to said engine speed deviation in such a manner that the target value increases substantially linearly until the deviation reaches a predetermined value and has a substantially constant maximum value after the deviation has reached the predetermined value.

2. A method of controlling a hydraulic power system comprising an internal combustion engine receiving a supply of fuel from a fuel injection pump, and at least one variable displacement hydraulic pump driven by the internal combustion engine, the method comprising the steps of:
   (a) obtaining an engine speed deviation from the difference between a target speed set by an accelerator operation of the internal combustion engine and an output speed of the engine;
   (b) obtaining a fuel injection target value based on at least said engine speed deviation, said fuel injection target value being in a predetermined functional relationship to said deviation;
   (c) controlling a fuel injection rate of said fuel injection pump based on said fuel injection target value;
   (d) determining, at the same time, a displacement volume target value of said hydraulic pump based on at least said engine speed deviation and an actual discharge pressure of the hydraulic pump in such a manner that an input torque of the hydraulic pump decreases as the engine speed deviation increases;
   (e) controlling the displacement volume of the hydraulic pump based on the displacement volume target value; and
   wherein step (b) comprises:
      (i) judging whether said target speed is in an idling range, an intermediate speed range, or a high speed range;
      (ii) obtaining said fuel injection target value from said engine speed deviation based on a first function set beforehand when the target speed is in the idling speed range;
      (iii) obtaining said fuel injection target value from said engine speed deviation based on a second function set beforehand when the target speed is in the intermediate speed range; and
      (iv) obtaining said fuel injection target value from the engine based on a present third function when the target speed is in the high speed range.

3. A method of controlling a hydraulic power system comprising an internal combustion engine receiving a supply of fuel from a fuel injection pump, and at least one variable displacement hydraulic pump driven by the internal combustion engine, the method comprising the steps of:
   (a) obtaining an engine speed deviation from the difference between a target speed set by an accelerator operation of the internal combustion engine and an output speed of the engine;
   (b) obtaining a fuel injection target value based on at least said engine speed deviation, said fuel injection target value being in predetermined functional relationship to said deviation;
   (c) controlling a fuel injection rate of said fuel injection pump based on said fuel injection target value;
   (d) determining, at the same time, a displacement volume target value of said hydraulic pump based on at least said engine speed deviation and an actual discharge pressure of the hydraulic pump in such a manner that an input torque of the hydraulic pump decreases as the engine speed deviation increases;
   (e) controlling the displacement volume of the hydraulic pump based on the displacement volume target value; and
   wherein step (d) comprises:
      (i) calculating the displacement volume target value from said engine speed deviation and said actual discharge pressure of the hydraulic pump based on a preset functional relationship in such a manner that as the engine speed deviation increases the product of the actual discharge pressure of the hydraulc pump and the displacement volume target value thereof decreases.

4. A control method as claimed in claim 2, wherein said first function and said second function are such that the fuel injection target value increases substantially linearly until the engine speed deviation reaches a first predetermined value and increases at a lower rate after it has reached the first predetermined value, the rate of increase being greater with the first function than with the second function, and wherein said third function is such that the fuel injection target value increases substantially linearly until the engine speed deviation reaches a second predetermined value and has a substantially constant maximum value after it has reached the second predetermined value.

5. A control method as claimed in claim 2, wherein said step (b) further comprises:
(v) obtaining an allowable maximum fuel injection rate from said engine speed deviation based on preset compensation characteristic function set beforehand; and
(vi) comparing the fuel injection target value obtained in step (ii), (iii) or (iv) with the allowable maximum fuel injection rate obtained in step (v) and selecting the allowable maximum fuel injection rate as a final fuel injection target value when the fuel injection target value is greater than the allowable maximum fuel injection rate.

6. A system for controlling a hydraulic power system comprising an internal combustion engine receiving a supply of fuel from a fuel injection pump, and at least one variable displacement hydraulic pump driven by the internal combustion engine, the system comprising:
(a) means for obtaining an engine speed deviation from the difference between a target speed set by an accelerator operation of the internal combustion engine and an output speed of the engine;
(b) means for obtaining a fuel injection target value based on at least said engine speed deviation, said fuel injection target value being in predetermined functional relation to said deviation;
(c) means for controlling a fuel injection rate of said fuel injection pump based on said fuel injection target value;
(d) means for determining, at the same time, a displacement volume target value of said hydraulic pump based on at least said engine speed deviation and an actual discharge pressure of the hydraulic pump in such a manner that the input torque of the hydraulic pump decreases as the engine speed deviation increases; and
(e) means for controlling the displacement volume of the hydraulic pump based on the displacement volume target value.

7. A method of controlling a hydraulic power system comprising an internal combustion engine receiving a supply of fuel from a fuel injection pump, and at least one variable displacement hydraulic pump driven by the internal combusion engine, the method comprising the steps of:
(a) obtaining an engine speed deviation from the difference between a target speed set by an accelerator operation of the internal combustion engine and an output speed of the engine;
(b) obtaining a fuel injection target value based on at least said engine speed deviation, said fuel injection target value being in a predetermined functional relationship to said deviation;
(c) controlling a fuel injection rate of said fuel injection pump based on said fuel injection target value;
(d) determining, at the same time, a displacement volume target value of said hydraulic pump based on at least said engine speed deviation and an actual discharge pressure of the hydraulic pump in such a manner that an input torque of the hydraulic pump decreases as the engine speed deviation increases;
(e) controlling the displacement volume of the hydraulic pump based on the displacement volume target value; and
wherein in step (b), said fuel injection target value is in the functional relationship to said engine speed deviation in such a manner that the target value increases until the deviation reaches a predetermined value and the increase in the target value is restricted thereafter, and in step (d), the decrease in the input torque of the hydraulic pump is initiated when the deviation at least approximately reaches said predetermined value at least when said target speed is in a high speed range.

8. A control method as claimed in claim 3, wherein said displacement volume target value is in hyperbolic functional relation to the actual discharge pressure.

9. A control method as claimed in claim 3, wherein step (d) further comprises:
(ii) comparing said displacement volume target value with an allowable maximum displacement volume calculated from the actual displacement volume alone of the hydraulic pump and selecting the allowable maximum displacement volume as a final displacement volume when the displacement volume target value is greater than the allowable maximum displacement volume.

10. A control method as claimed in claim 3, wherein step (d) further comprises:
(ii) comparing the displacement volume target value, an externally manipulated variable of the displacement volume of the hydraulic pump and the allowable maximum displacement volume of the hydraulic pump calculated from the actual discharge pressure thereof alone with one another and selecting a smaller one of the externally manipulated variable and the allowable maximum displacement volume as a final displacement volume target value when the previous displacement volume target value is greater than the externally manipulated variable and/or the allowable maximum displacement volume.

11. A control method as claimed in claim 7, wherein step (d) comprises:
(i) obtaining a control pressure command value based on said engine speed deviation, said control pressure command value being in predetermined functional relation to the deviation;
(ii) converting said control pressure command value to a hydraulic control pressure; and
(iii) introducing said control pressure and said actual discharge pressure of the hydraulic pump to hydraulic servo means for adjusting the displacement volume of the hydraulic pump thereby to determine said displacement volume target value.

12. A control method as claimed in claim 11, wherein in step (i), said control pressure command value is in functional relation to said engine speed deviation in such a manner that the command value has a substantially constant minimum value until the engine speed deviation reaches a first predetermined value and increases substantially linearly until the deviation reaches a second predetermined value, and then has a substantially constant maximum value after the deviation has reached the second predetermined value.

13. A control method as claimed in claim 11, wherein in step (i), said control pressure command value is in functional relation to said engine speed deviation in such a manner that the command value has a substantially constant maximum value until the engine speed deviation reaches a first predetermined value and decreases substantially linearly until the deviation reaches a second predetermined value, and then has a substantially constant minimum value after the deviation has reached the second predetermined value.

14. A control method as claimed in claim 7 wherein said hydraulic drive system comprises a plurality of variable displacement hydraulic pumps, such method further comprising the steps of:
(f) deciding the types of hydraulic actuators driven by at least two of said hydraulic pumps; and
(g) performing steps (d) and (e) with respect to said two hydraulic pumps in such a manner that the distribution ratio of the output torque of the internal combustion engine to said two hydraulic pumps has a predetermined value in conformity with the decided types of the hydraulic actuators.

15. A control method as claimed in claim 14, wherein the step (d) performed in step (g) comprises calculating the displacement volume target values of the respective hydraulic pumps from the engine speed deviation and actual discharge pressures of the two hydraulic pumps based on preset predetermined functional relations for the hydraulic actuators in such a manner that as the deviation increases the products of the actual discharge pressures of the hydraulic pumps and the displacement volume target values decrease.

16. A control method as claimed in claim 14, wherein step (f) comprises actuating electric switches in conjunction with actuation of said hydraulic actuators, and the step (d) performed in step (g) comprises:
(i) obtaining a control pressure command value based on said engine speed deviation, said control pressure command value being in predetermined functional relation to the deviation,
(ii) obtaining at least two corrected control pressure command values having said distribution ratio from said control pressure target value by actuating said electric switches:
(iii) converting said two corrected control pressure command values into hydraulic control pressures;
(iv) introducing an actual discharge pressure of each said hydraulic pump to one end of a servo valve for adjusting the displacement volume of the associated hydraulic pump, said servo valve being connected to said hydraulic pump in such a manner that the position represents the displacement volume of the hydraulic pump, said servo valve having a spring mounted at the other end thereof; and
(v) introducing the control pressures into the other ends of said servo valves to adjust the biasing forces of the respective springs thereby to determine the positions of the servo valves by balancing the discharge pressures and the biasing forces of the springs.

17. A control method as claimed in claim 7, wherein step (d) comprises:
(i) calculating the discharge pressure target value from the engine speed deviation and the actual displacement volume of the hydraulic pump based on a functional relation set beforehand in such a manner that as the engine speed deviation increases the product of the actual displacement volume of the hydraulic pump and the discharge pressure target value of the hydraulic pump increases;
(ii) obtaining the difference between the discharge pressure target value and the actual discharge pressure;
(iii) calculating a displacement volume increment of the hydraulic pump from said pressure difference based on a preset functional relation in such a manner that as the pressure difference increases the displacement volume increment increases; and
(iv) obtaining a new displacement volume target value by adding to or subtracting from the previous displacement volume target value said displacement volume increment.

18. A control method as claimed in claim 17, wherein the discharge pressure target value of step (i) is in hyperbolic functional relation to said actual displacement volume.

19. A control method as claimed in claim 17, wherein the discharge pressure target value of step (i) is in hyperbolic functional relation to the actual displacement volume and smaller than an allowable maximum discharge pressure set by the rated pressure of the equipment.

20. A control method as claimed in claim 17, wherein the displacement volume increment of step (iii) is in functional relation to said pressure difference in such a manner that the increment increases substantially linearly until the pressure difference reaches a predetermined value and has a substantially constant maximum value after the pressure difference has reached the predetermined value.

21. A control system as claimed in claim 6, wherein said fuel injection target value of said means (b) is set in functional relation to the engine speed deviation in such a manner that the target value increases substantially linearly until the deviation reaches a predetermined value and has a substantially constant maximum value after the deviation has reached the predetermined value.

22. A control system as claimed in claim 21, wherein said means (d) comprises:
(i) means for calculating said displacement volume target value from the engine speed deviation and the actual discharge pressure of the hydraulic pump based on a preset functional relation in such a manner that as the engine speed deviation increases the product of the actual discharge pressure of the hydraulic pump and the displacement volume target value thereof decreases.

23. A control system as claimed in claim 22, wherein said displacement volume target value of said means (i) is set at a hyperbolic functional relation to the actual discharge pressure.

24. A control system as claimed in claim 6, wherein said means (d) comprises:
(i) means for obtaining a control pressure command value based on said engine speed deviation, said control pressure command value being in predetermined functional relation to the deviation;
(ii) means for converting said control pressure command value into a hydraulic control pressure; and
(iii) means for introducing said control pressure and said actual discharge pressure of the hydraulic pump to hydraulic servo means for adjusting the displacement volume of the hydraulic pump thereby to determine said displacement volume target value.

25. A control system as claimed in claim 24, wherein said control pressure command value of said means (i) is in functional relation to said engine speed deviation in such a manner that the command value has a substantially constant minimum value until the engine speed deviation reaches a first predetermined value and increases substantially linearly until the deviation reaches a second predetermined value, and then has a substantially constant maximum value after the deviation has reached the second predetermined value.

26. A control system as claimed in claim 24, wherein said control pressure command value of said means (i) is in functional relation to said engine speed deviation in such a manner that the command value has a substantially constant maximum value until the engine speed deviation reaches a first predetermined value and decreases substantially linearly until the deviation reaches a second predetermined value, and then has a substantially constant minimum value after the deviation has reached the second predetermined value.

27. A control system as claimed in claim 6 wherein said hydraulic power system comprises a plurality of variable displacement hydraulic pumps, such control system further comprising:
(f) means for deciding the types of hydraulic actuators driven by at least two of said hydraulic pumps; and
(g) means for determining said displacement volume target values with respect to said two hydraulic pumps in such a manner that the distribution ratio of the output torque of the internal combustion engine to said two hydraulic pumps has a predetermined value in conformity with the decided types of the hydraulic actuators.

28. A control system as claimed in claim 6, wherein said means (d) comprises:
(i) means for calculating the discharge pressure target value from the engine speed deviation and the actual displacement volume of the hydraulic pump based on a preset functional relation in such a manner that as the engine speed deviation increases the product of the actual displacement volume of the hydraulic pump and the discharge pressure target value of the hydraulic pump increases;
(ii) means for obtaining the difference between the discharge pressure target value and the actual discharge pressure;
(iii) means for calculating a displacement volume increment of the hydraulic pump from said pressure difference based on a preset functional relation in such a manner that as the pressure difference increases the displacement volume increment of the hydraulic pump increases; and
(iv) means for obtaining a new displacement volume target value by adding to or subtracting from the previous displacement volume target value said displacement volume increment.

29. A control system as claimed in claim 28, wherein the discharge pressure target value of said means (i) is set at a hyperbolic functional relation to the actual displacement volume.

30. A control system as claimed in claim 28, wherein the discharge pressure target value of said means (i) is set at a hyperbolic functional relation to the actual displacement volume and smaller than an allowable maximum discharge pressure set by the rated pressure of the equipment.

31. A control system as claimed in claim 28, wherein the displacement volume increment of said means (iii) is set at a functional relation to said pressure difference in such a manner that the increment increases substantially linearly until the pressure difference reaches a predetermined value and has a substantially constant maximum value after the pressure difference has reached the predetermined value.

* * * * *